US012228257B2

(12) United States Patent
Chen

(10) Patent No.: US 12,228,257 B2
(45) Date of Patent: Feb. 18, 2025

(54) TANGLE-RESISTANT DECORATIVE LIGHTING ASSEMBLY

(71) Applicant: Willis Electric Co., Ltd, Taipei (TW)

(72) Inventor: Johnny Chen, Taipei (TW)

(73) Assignee: Willis Electric Co., Ltd., Taipei (TW)

( * ) Notice: Subject to any disclaimer, the term of this patent is extended or adjusted under 35 U.S.C. 154(b) by 0 days.

(21) Appl. No.: 18/486,865

(22) Filed: Oct. 13, 2023

(65) Prior Publication Data

US 2024/0110676 A1 Apr. 4, 2024

Related U.S. Application Data

(63) Continuation of application No. 17/706,971, filed on Mar. 29, 2022, now Pat. No. 11,808,418, which is a (Continued)

(51) Int. Cl.
*F21S 4/15* (2016.01)
*C11D 7/50* (2006.01)
(Continued)

(52) U.S. Cl.
CPC .............. *F21S 4/15* (2016.01); *C11D 7/5018* (2013.01); *C11D 7/5022* (2013.01); *F21V 23/001* (2013.01); *F21V 23/06* (2013.01); *H01R 13/627* (2013.01); *H01R 25/003* (2013.01); *C11D 2111/16* (2024.01); *F21S 4/10* (2016.01); *F21W 2121/00* (2013.01); *F21W 2121/006* (2013.01)

(58) Field of Classification Search
CPC .. F21S 4/15; F21S 4/10; F21V 23/001; F21V 23/06; F21W 2121/00; F21W 2121/006; H01R 13/627; H01R 25/003; H01R 13/6273
See application file for complete search history.

(56) References Cited

U.S. PATENT DOCUMENTS 7,592,276 B2 * 9/2009 Hill ...................... D03D 15/258 313/511
10,222,037 B2 * 3/2019 Chen ........................ H01B 7/04
(Continued)

OTHER PUBLICATIONS

Office Action for U.S. Appl. No. 18/435,661, mailed Aug. 15, 2024, Inventor: Johnny Chen (6 pages).

*Primary Examiner* — Joseph L Williams
(74) *Attorney, Agent, or Firm* — Christensen, Fonder, Dardi & Herbert PLLC; John P. Fonder

(57) ABSTRACT

A decorative lighting assembly comprises a first power wire electrically connected to a first power contact and a second power wire electrically connected to a second power contact. The first power wire and the second power wire cooperate to surround a display area of the decorative lighting assembly. Lamp assemblies are distributed across the display area. The lamp assemblies include a first row of lamp assemblies aligned along a first line, a second row aligned along a second line, a third row aligned along a third line, and a fourth row of lamp aligned along a fourth line. A first cord is disposed along a first zig-zag path connecting the lamp assemblies in the first row with the lamp assemblies in the second row. Intermediate wires are disposed along a second zig-zag path connecting the lamp assemblies in the second row with the lamp assemblies in the third row.

20 Claims, 20 Drawing Sheets

Related U.S. Application Data continuation of application No. 16/894,989, filed on Jun. 8, 2020, now Pat. No. 11,306,881, which is a continuation-in-part of application No. 16/751,056, filed on Jan. 23, 2020, now abandoned, and a continuation of application No. 16/368,681, filed on Mar. 28, 2019, now Pat. No. 10,711,954, said application No. 16/751,056 is a continuation of application No. 16/241,745, filed on Jan. 7, 2019, now Pat. No. 10,578,289, which is a continuation of application No. 15/588,114, filed on May 5, 2017, now Pat. No. 10,222,037, said application No. 16/368,681 is a continuation of application No. 15/333,535, filed on Oct. 25, 2016, now Pat. No. 10,267,464, said application No. 15/588,114 is a continuation of application No. 14/886,344, filed on Oct. 19, 2015, now Pat. No. 9,671,097, which is a continuation of application No. 14/627,427, filed on Feb. 20, 2015, now Pat. No. 9,243,788, which is a continuation of application No. 14/485,911, filed on Sep. 15, 2014, now Pat. No. 9,140,438, which is a continuation-in-part of application No. 14/328,221, filed on Jul. 10, 2014, now Pat. No. 9,157,588.

(60) Provisional application No. 62/246,423, filed on Oct. 26, 2015, provisional application No. 61/877,854, filed on Sep. 13, 2013.

(51) Int. Cl.

| | |
|---|---|
| ***F21S 4/10*** | (2016.01) |
| ***F21V 23/00*** | (2015.01) |
| ***F21V 23/06*** | (2006.01) |
| ***H01R 13/627*** | (2006.01) |
| ***H01R 25/00*** | (2006.01) |
| *F21W 121/00* | (2006.01) |

(56) References Cited

U.S. PATENT DOCUMENTS

| | | | | |
|---|---|---|---|---|
| 10,267,464 | B2 * | 4/2019 | Chen | F21V 23/06 |
| 10,711,954 | B2 * | 7/2020 | Chen | H01R 13/627 |
| 11,306,881 | B2 * | 4/2022 | Chen | H01R 13/627 |
| 11,808,418 | B2 * | 11/2023 | Chen | H01R 25/003 |
| 11,920,750 | B2 | 3/2024 | Chen | |
| 2012/0326634 | A1 * | 12/2012 | Li | H05B 47/18<br>315/312 |

* cited by examiner

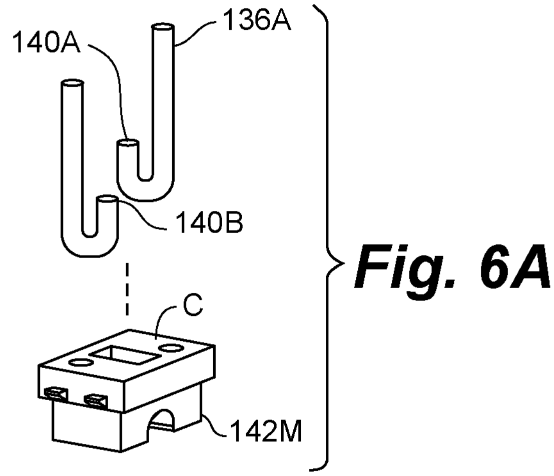
Fig. 6A
Fig. 6B
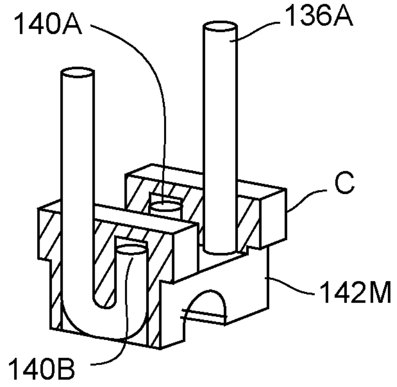
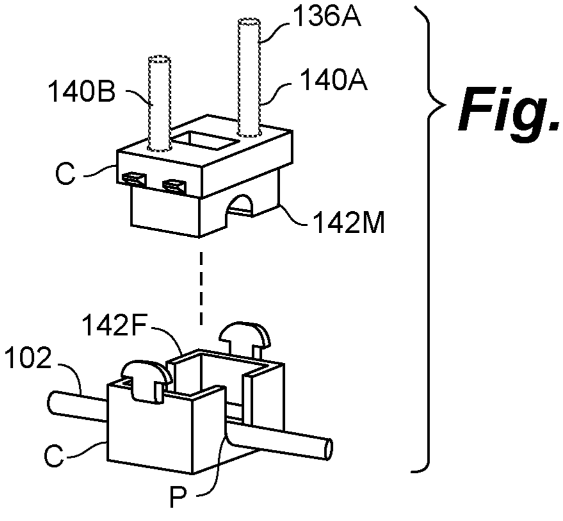
Fig. 6C
Fig. 6D
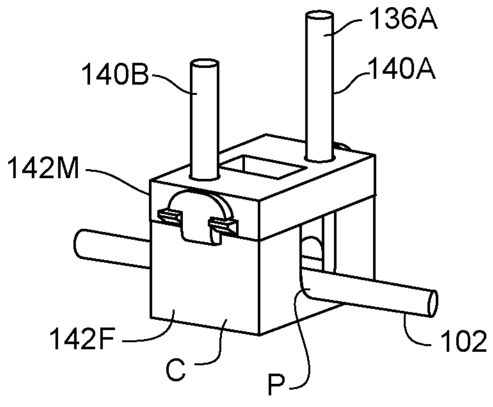

TANGLE-RESISTANT DECORATIVE LIGHTING ASSEMBLY

RELATED APPLICATIONS

The present application is a continuation of Ser. No. 17/706,971, filed Mar. 29, 2022, which is a continuation of U.S. patent application Ser. No. 16/894,989, filed Jun. 8, 2020, entitled TANGLE-RESISTANT DECORATIVE LIGHTING ASSEMBLY, which is a continuation of U.S. patent application Ser. No. 16/368,681, filed Mar. 28, 2019, entitled TANGLE-RESISTANT DECORATIVE LIGHTING ASSEMBLY which is a continuation of U.S. patent application Ser. No. 15/333,535, filed Oct. 25, 2016, now U.S. Pat. No. 10,267,464, issued Apr. 23, 2019, entitled TANGLE-RESISTANT DECORATIVE LIGHTING ASSEMBLY, which claims the benefit of U.S. Provisional Application No. 62/246,423, filed Oct. 26, 2015, entitled TANGLE-RESISTANT DECORATIVE LIGHTING ASSEMBLY, all of which are incorporated herein by reference in their entireties.

U.S. patent application Ser. No. 16/894,989, filed Jun. 8, 2020, entitled TANGLE-RESISTANT DECORATIVE LIGHTING ASSEMBLY is a continuation-in-part of U.S. patent application Ser. No. 16/751,056 filed Jan. 23, 2020 entitled DECORATIVE LIGHTING WITH REINFORCED WIRING, which is a continuation of Ser. No. 16/241,745, filed Jan. 7, 2019, now U.S. Pat. No. 10,578,289, issued Mar. 3, 2020, entitled DECORATIVE LIGHTING WITH REINFORCED WIRING, which is a continuation of U.S. patent application Ser. No. 15/588,114, filed May 5, 2017, now U.S. Pat. No. 10,222,037, issued Mar. 5, 2019, entitled DECORATIVE LIGHTING WITH REINFORCED WIRING, which is a continuation of U.S. patent application Ser. No. 14/886,344, filed Oct. 19, 2015, now U.S. Pat. No. 9,671,097, issued Jun. 6, 2017, entitled DECORATIVE LIGHTING WITH REINFORCED WIRING, which is a continuation of U.S. patent application Ser. No. 14/627,427, filed Feb. 20, 2015, now U.S. Pat. No. 9,243,788, issued Jan. 26, 2016, entitled DECORATIVE LIGHTING WITH REINFORCED WIRING, which is a continuation of U.S. patent application Ser. No. 14/485,911, filed Sep. 15, 2014, now U.S. Pat. No. 9,140,438, issued Sep. 22, 2015, entitled DECORATIVE LIGHTING WITH REINFORCED WIRING, which is a continuation-in-part of U.S. patent application Ser. No. 14/328,221, filed Jul. 10, 2014, now U.S. Pat. No. 9,157,588, issued Oct. 13, 2015, entitled DECORATIVE LIGHTING WITH REINFORCED WIRING, which claims the benefit of U.S. Provisional Application No. 61/877,854, filed Sep. 13, 2013, entitled DECORATIVE LIGHTING WITH REINFORCED WIRING, all of which are incorporated herein by reference in their entireties.

FIELD OF THE DISCLOSURE

The present invention is generally directed to decorative lighting. More specifically, the present invention is directed to decorative lighting assemblies having a net-like structure.

BACKGROUND OF THE INVENTION

Decorative lighting assemblies, and in particular net lights are traditionally assembled using elaborate patterns of interconnected wires and lights to form a particular desired shape or structure. Net lights, for example, often form rectangular or square outlines using zig-zag patterns of conductors powering incandescent or light-emitting diode (LED) lamps.

The extensive lengths of wire conductors twisted together to form the desired shape or outline of such decorative assemblies results in a consumer product prone to tangling. Not only does such tangling of wires result in consumer frustration, but the untangling of the wires can result in wires being pulled from their connectors, resulting in potential safety hazards.

Further, from a manufacturing perspective, assembling net-like decorative lighting assemblies to achieve consistent appearances can be challenging.

SUMMARY

A decorative lighting assembly comprises a first power wire electrically connected to a first power contact and a second power wire electrically connected to a second power contact. The first power wire and the second power wire cooperate to surround a display area of the decorative lighting assembly. A plurality of lamp assemblies are distributed across the display area. The plurality of lamp assemblies includes a first row of lamp assemblies aligned along a first line, a second row of lamp assemblies aligned along a second line, a third row of lamp assemblies aligned along a third line, and a fourth row of lamp assemblies aligned along a fourth line. A first cord is disposed along a first zig-zag path connecting the lamp assemblies in the first row with the lamp assemblies in the second row. A plurality of intermediate wires are disposed along a second zig-zag path connecting the lamp assemblies in the second row with the lamp assemblies in the third row. A second cord is disposed along a third zig-zag path connecting the lamp assemblies in the third row with the lamp assemblies in the fourth row.

BRIEF DESCRIPTION OF THE DRAWINGS

The invention can be understood in consideration of the following detailed description of various embodiments of the invention in connection with the accompanying drawings, in which:

FIG. 6A is an exploded perspective view showing portions of a cord and a male portion of a fastener C;

FIG. 6B is an additional perspective view showing the cord and the male portion the fastener shown in FIG. 6A;

FIG. 6C is an exploded perspective view showing the male portion of the fastener and the female portion of the fastener shown in FIG. 6B;

FIG. 6D is an exploded perspective view showing the cord and first power wire of FIG. 6C coupled by the fastener;

Figure 1:
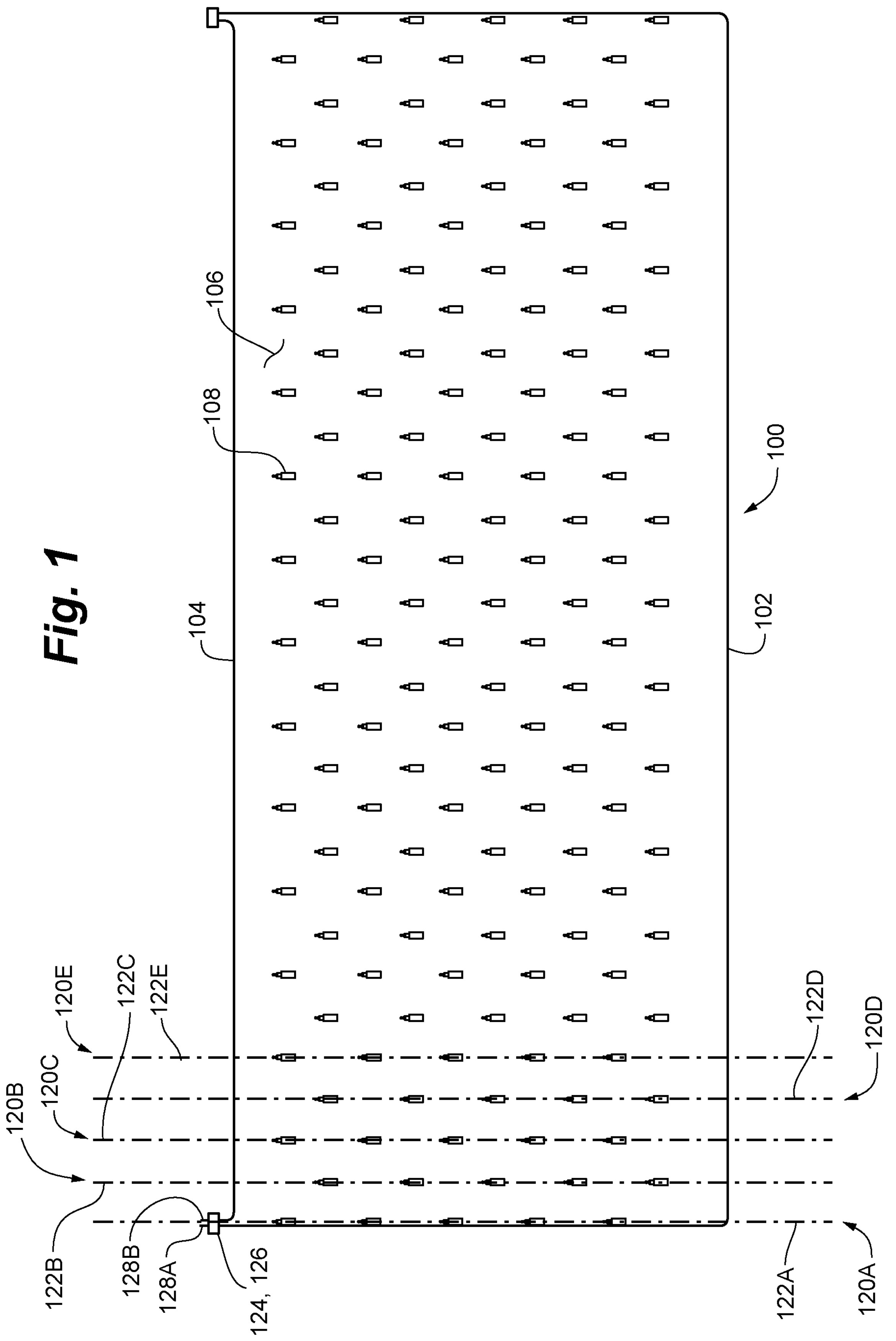
FIG. 1 is a plan view showing an illustrative embodiment of a decorative lighting assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

FIG. 1 is a plan view showing an illustrative embodiment of a decorative lighting assembly 100. Decorative lighting assembly 100 comprises a first power wire 102 and a second power wire 104. In FIG. 1, first power wire 102 and second power wire 104 are cooperating to surround a display area 106 of decorative lighting assembly 100. With reference to FIG. 1 it will be appreciated that decorative lighting assembly 100 includes a plurality of lamp assemblies 108 distributed across display area 106. The plurality of lamp assemblies 108 include a first column 120A of lamp assemblies 108 aligned along a first line 122A, a second column 120B of lamp assemblies 108 aligned along a second line 122B, and a third column 120C of lamp assemblies 108 aligned along a third line 122C.

A plurality of lamp assemblies 108 of decorative lighting assembly 100 may be inter-connected by wires to form one or more electrical circuits. A plurality of lamp assemblies 108 of decorative lighting assembly 100 may be mechanically coupled by cords which provide mechanical support. In some embodiments, the wires and the cords cooperate to form a net-like structure. In the embodiment of FIG. 1, the plurality of lamp assemblies 108 include a fourth column 120D of lamp assemblies 108 aligned along a first line 122D and a fifth column 120E of lamp assemblies aligned along a fifth line 122E.

Decorative lighting assembly 100 of FIG. 1 includes a power plug 124. Power plug 124 may comprise a traditional power plug comprising housing 126, first power terminal 128A and a second power terminal 128B for plugging into an outlet of an external power source, which may be an alternating-current (AC) power source. First power wire 102 is electrically connected to first power terminal 128A of power plug 124. Second power wire 104 is electrically connected to second power terminal 128B of power plug 124. In some embodiments, first power wire 102 and second power wire 104 may comprise a reinforced wire such as the reinforced wire described in issued U.S. Pat. No. 9,243,788, which is herein incorporated by reference in its entirety. Reinforced wire is depicted in FIGS. 19-22 and described herein.

With reference to FIG. 1, it will be appreciated that display area 106 of decorative lighting assembly 100 has a shape generally corresponding to a four-sided polygon. In the embodiment of FIG. 1, the shape of display area generally corresponds to a rectangle having a first long side, a second long side, a first short side, and a second short side. First power wire 102 defines the first short side, the first long side, and the second short side of a rectangle in the embodiment of FIG. 1. Second power wire 104 defines the second long side of a rectangle in the embodiment of FIG. 1.

Figure 2:
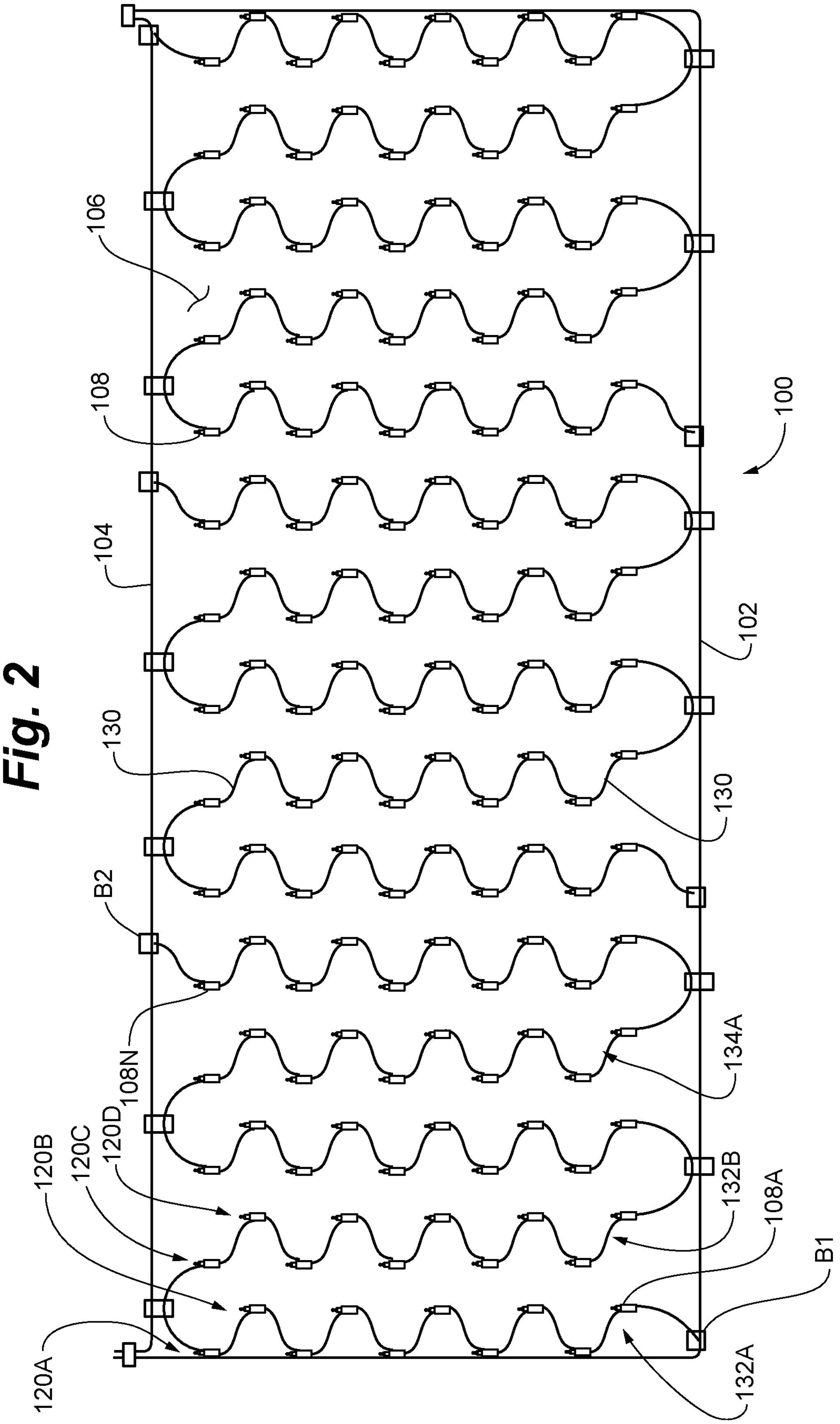
FIG. 2 is a plan view showing an additional illustrative embodiment of the decorative lighting assembly shown in FIG. 1.

FIG. 2 is a plan view showing an additional illustrative embodiment of decorative lighting assembly 100 shown in the previous figure. Decorative lighting assembly 100 comprises a first power wire 102 and a second power wire 104. In FIG. 2, first power wire 102 and second power wire 104 are cooperating to surround a display area 106 of decorative lighting assembly 100. With reference to FIG. 2 it will be appreciated that decorative lighting assembly 100 includes a plurality of lamp assemblies 108 distributed across display area 106. The plurality of lamp assemblies 108 include a first column 120A of lamp assemblies 108, a second column 120B of lamp assemblies 108, a third column 120C of lamp assemblies 108, and a fourth column 120D of lamp assemblies 108.

In the embodiment of FIG. 2, a plurality of intermediate wires 130 are disposed along a first zig-zag path 132A connecting the lamp assemblies in first column 120A with the lamp assemblies in second column 120B. In some embodiments, decorative lighting assembly 100 may include a cord that is disposed along a second zig-zag path connecting the lamp assemblies in second column 120B with the lamp assemblies in third column 120C. In the embodiment of FIG. 2, decorative lighting assembly 100 includes a plurality of intermediate wires 130 that are disposed along a third zig-zag path 132C connecting the lamp assemblies in third column 120C with the lamp assemblies in fourth column 120D. In some embodiments, intermediate wires 130, first power wire 102 and second power wire 104 may comprise a reinforced wire such as the reinforced wire described in issued U.S. Pat. No. 9,243,788, which is herein incorporated by reference in its entirety. Reinforced wire is depicted in FIGS. 19-22 and described herein.

Decorative lighting assembly 100 of FIG. 2, includes a first series circuit 134A comprising a first lamp assembly 108A electrically connected to first power wire 102 at a connector B1 and an nth lamp assembly 108N electrically connected to second power wire 104 at a connector B2. In the embodiment of FIG. 2, a plurality of intermediate lamp assemblies 108 are electrically connected in series between first lamp assembly 108A and nth lamp assembly 108A.

With reference to FIG. 2, it will be appreciated that first series circuit 134 follows a winding path between connector B1 and connector B2 so that the lamp assemblies 108 are distributed across display area 106. In the embodiment of FIG. 2, the winding path of first series circuit 134 includes a plurality of intermediate wires 130 disposed along the first zig-zag path 132A connecting the lamp assemblies in first column 120A with the lamp assemblies 108 in second column 120B. First series circuit 134 also includes the plurality of intermediate wires 130 disposed along third zig-zag path 132C connecting the lamp assemblies 108 in third column 120C with the lamp assemblies 108 in fourth column 120D.

Figure 3:
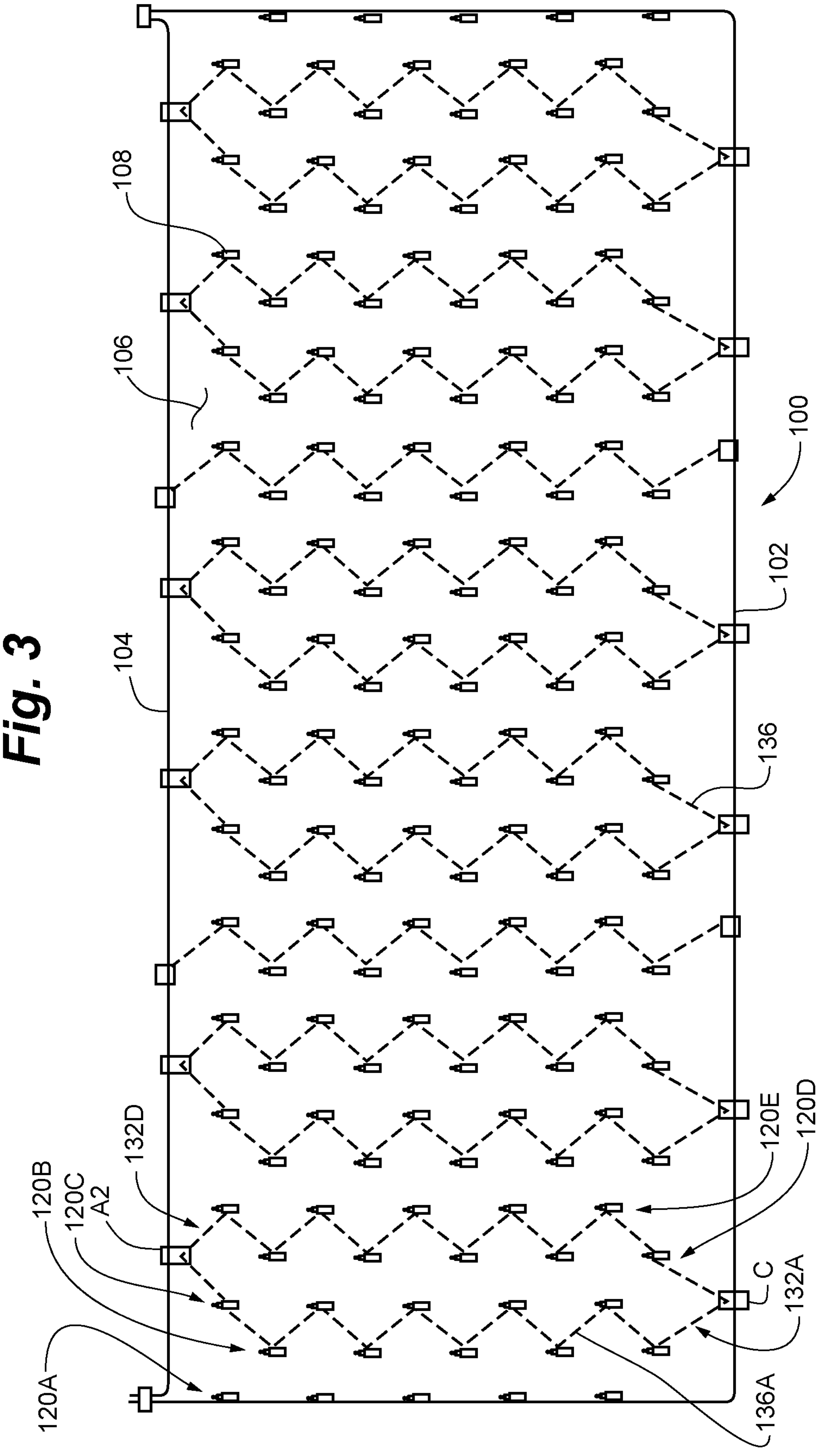
FIG. 3 is a plan view showing an additional illustrative embodiment of the decorative lighting assembly shown in FIG. 1.

FIG. 3 is a plan view showing an additional illustrative embodiment of decorative lighting assembly 100 shown in the previous figure. Decorative lighting assembly 100 comprises a first power wire 102 and a second power wire 104. In FIG. 3, first power wire 102 and second power wire 104 are cooperating to surround a display area 106 of decorative lighting assembly 100. With reference to FIG. 3 it will be appreciated that decorative lighting assembly 100 includes a plurality of lamp assemblies 108 distributed across display area 106. The plurality of lamp assemblies 108 include a first column 120A of lamp assemblies 108, a second column 120B of lamp assemblies 108, a third column 120C of lamp assemblies 108, a fourth column 120 of lamp assemblies 108, and a fifth column 120E of lamp assemblies 108.

In the embodiment of FIG. 3, a plurality of lamp assemblies 108 of decorative lighting assembly 100 are mechanically coupled by cords 136 which provide mechanical support. In some embodiments, a plurality of lamp assemblies 108 of decorative lighting assembly 100 may be inter-connected by wires to form one or more electrical circuits. In some embodiments, the wires and the cords cooperate to form a net-like structure.

Decorative lighting assembly 100 of FIG. 1, includes a cord 136 that is disposed along a second zig-zag path 132A connecting the lamp assemblies in second column 120B with the lamp assemblies in third column 120C. In the embodiment of FIG. 3, cord 136 also extends along a fourth zig-zag path 132D connecting the lamp assemblies in fourth column 120D with the lamp assemblies in fifth column 120E. Cord 136 is illustrated using dashed lines in FIG. 3. In some embodiments, cord 136 may comprise a plurality of cord segments.

In the embodiment of FIG. 3, cord 136A comprises a single cord that extends through both second zig-zag path 132B and the fourth zig-zag path 132D. Decorative lighting assembly 100 of FIG. 3, includes a fastener C that mechanically couples a first end of cord 136A and a second end of cord 136A to first power wire 102. In the embodiment of FIG. 3, first power wire 102 extends through a passageway defined by fastener C.

Decorative lighting assembly 100 of FIG. 3 also includes a bushing A2 that mechanically couples an intermediate portion of cord 136A to second power wire 104. In the embodiment of FIG. 3, cord 136A and second power wire 104 extend through a passageway defined by bushing A2. Also in the embodiment of FIG. 3, cord 136A extends through a passageway defined by a clip of each lamp assembly 108 in second column 120A and each lamp assembly 108 in third column 120C.

Figure 4:
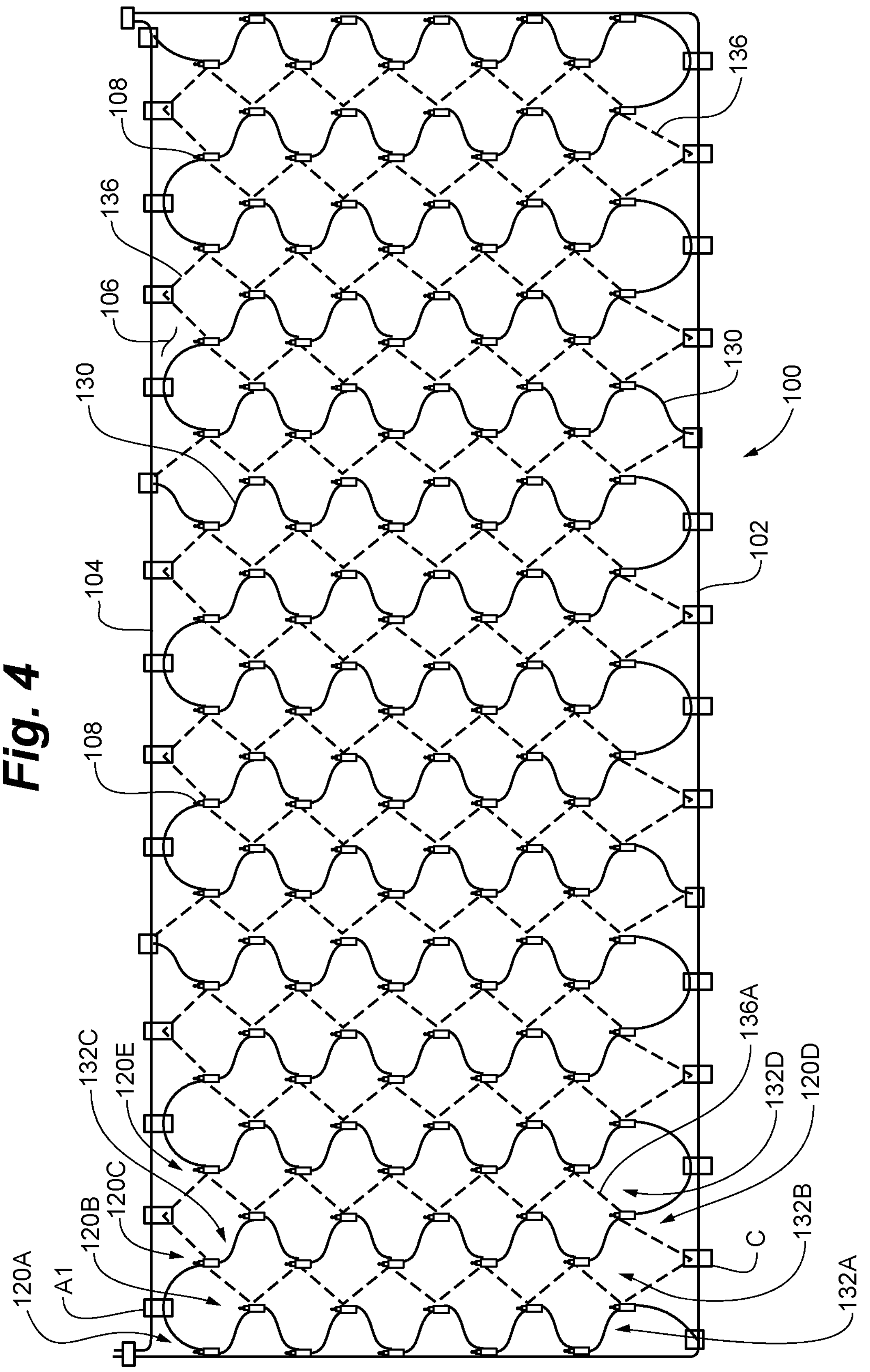
FIG. 4 is a plan view showing an additional illustrative embodiment of the decorative lighting assembly shown in FIG. 1.

FIG. 4 is a plan view showing an additional illustrative embodiment of decorative lighting assembly 100 shown in the previous figure. Decorative lighting assembly 100 comprises a first power wire 102 and a second power wire 104. In FIG. 4, first power wire 102 and second power wire 104 are cooperating to surround a display area 106 of decorative lighting assembly 100. With reference to FIG. 4 it will be appreciated that decorative lighting assembly 100 includes a plurality of lamp assemblies 108 distributed across display area 106. The plurality of lamp assemblies 108 include a first column 120A of lamp assemblies 108, a second column 120B of lamp assemblies 108, a third column 120C of lamp assemblies 108, a fourth column 120 of lamp assemblies 108, and a fifth column 120E of lamp assemblies 108.

In the embodiment of FIG. 4, a plurality of lamp assemblies 108 of decorative lighting assembly 100 are interconnected by intermediate wires 130 to form electrical circuits. Also in the embodiment of FIG. 4, a plurality of lamp assemblies 108 of decorative lighting assembly 100 are mechanically coupled by cords 136 which provide mechanical support. In the embodiment of FIG. 4, the wires and the cords cooperate to form a net-like structure. For purposes of illustration, the cords are illustrated using dashed lines and the wires are illustrated using solid lines in FIG. 4.

In the embodiment of FIG. 4, a plurality of intermediate wires 130 are disposed along a first zig-zag path 132A connecting the lamp assemblies in first column 120A with the lamp assemblies in second column 120B. Also in the embodiment of FIG. 4, decorative lighting assembly 100 includes a cord 136A that extends along a second zig-zag path 132B connecting the lamp assemblies in second column 120B with the lamp assemblies in third column 120C. A plurality of intermediate wires 130 are disposed along a third zig-zag path 132C connecting the lamp assemblies in third column 120C with the lamp assemblies in fourth column 120D. In the embodiment of FIG. 4, cord 136A extends along a fourth zig-zag path 132D connecting the lamp assemblies in fourth column 120D with the lamp assemblies in fifth column 120E. Cord 136A is illustrated using dashed lines in FIG. 4. In some embodiments, cord 136A may comprise a plurality of cord segments.

In the embodiment of FIG. 4, cord 136A comprises a single cord that extends through both second zig-zag path 132B and the fourth zig-zag path 132D. Decorative lighting assembly 100 of FIG. 4, includes a fastener C that mechanically couples a first end of cord 136A and a second end of cord 136A to first power wire 102. In the embodiment of FIG. 4, first power wire 102 extends through a passageway defined by fastener C.

With reference to FIG. 4, it will be appreciated that a top-most intermediate wire extends between a top-most lamp assembly in first column 120A and a top-most lamp assembly in third column 120C. In the embodiment of FIG. 4, a bushing A1 mechanically couples an intermediate portion of the first top-most intermediate wire to second power wire 104. In the embodiment of FIG. 4, the second power wire 104 and the top-most intermediate wire extend through a passageway defined by bushing A1.

In some embodiments of decorative lighting assembly 100, the intermediate wires 130 have a first outer diameter, the cords 136 have a second outer diameter, and the second outer diameter is substantially equal to the first outer diameter so that decorative lighting assembly 100 has a uniform appearance.

In some embodiments of decorative lighting assembly 100, the intermediate wires 130 comprise a plurality of conductor strands and an outer insulating layer adjacent to, and covering, one or more of the conductor strands. The cords 136 may comprise a solid strand. In some embodiments of decorative lighting assembly 100, the insulating layer of the intermediate wires 130 and the solid strand of the cords 136 comprise the same material so that the decorative lighting assembly has a uniform appearance. In some embodiments of decorative lighting assembly 100, the insulating layer of the intermediate wires 130 and the solid strand of the cords 136 are substantially the same color so that the decorative lighting assembly has a uniform appearance.

In some embodiments of decorative lighting assembly 100, the first power wire comprises 18 AWG wire, the second power wire comprises 18 AWG wire, and the intermediate wires comprise 22 AWG wire.

In some embodiments of decorative lighting assembly 100, the first power wire comprises 18 AWG wire, the second power wire comprises 18 AWG wire, and the intermediate wires comprise 22 AWG reinforced wire.

In some embodiments of decorative lighting assembly 100, the first power wire comprises 18 AWG wire, the second power wire comprises 18 AWG wire, and the intermediate wires comprise 25 AWG reinforced wire.

Figure 5A:
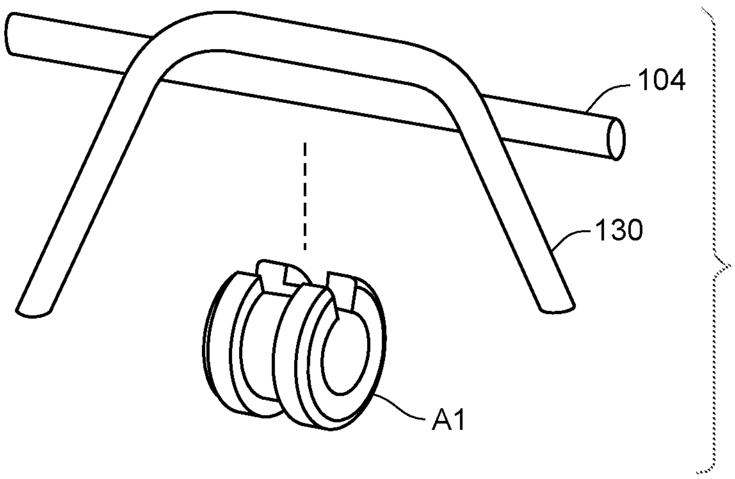
FIG. 5A is an exploded perspective view showing a power wire, an intermediate wire, and a bushing.
Figure 5B:
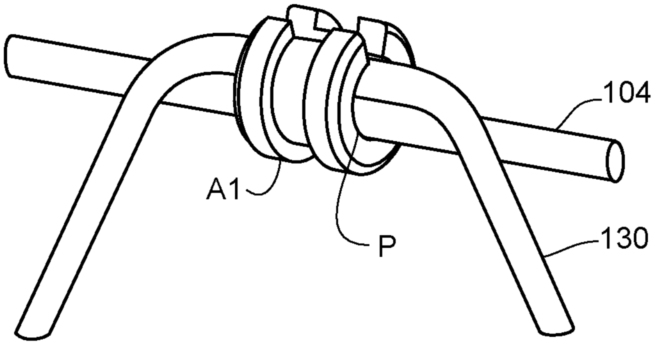
FIG. 5B is a perspective view showing the second power wire, the intermediate wire, and the bushing shown in of FIG. 5A.

FIG. 5A is an exploded perspective view showing a second power wire 104, an intermediate wire 130, and a bushing A1. FIG. 5B is a perspective view showing second power wire 104, intermediate wire 130, and bushing A1 of FIG. 5A in an assembled state. In FIG. 5B, intermediate wire 130 and second power wire 104 can be see extending through a passageway P defined by bushing A1.

Figure 5C:
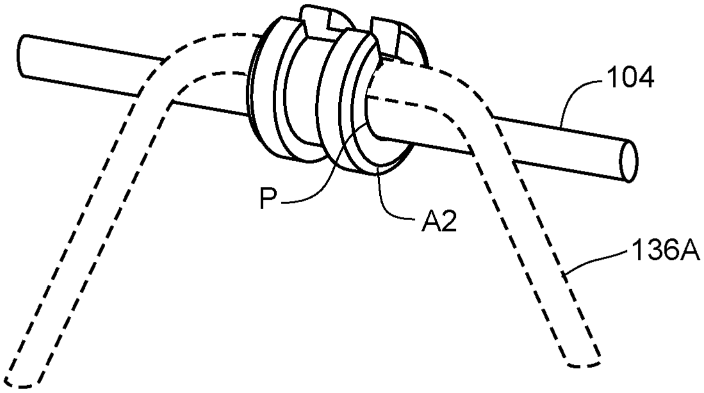
FIG. 5C is a perspective view showing the second power wire, the intermediate wire, and the bushing shown in of FIG. 5A.

FIG. 5C is a perspective view showing a second power wire 104, a cord 136, and a bushing A2. In the embodiment of FIG. 5C, cord 136A and second power wire 104 extend through a passageway P defined by bushing A2.

FIG. 6A is an exploded perspective view showing portions of a cord 136A and a male portion 142M of fastener C. A first end 140A and a second end 140B of cord 136A are visible in FIG. 6A.

FIG. 6B is an additional perspective view showing portions of cord 136A and male portion 142M of fastener C. In the embodiment of FIG. 6B, first end 140A and second end 140B of cord 136A are fixed to male portion 142M of fastener C.

FIG. 6C is an exploded perspective view showing a male portion 142M of fastener C and a female portion 142F of fastener C. In the embodiment of FIG. 6C, first end 140A and second end 140B of cord 136A are fixed to male portion 142M of fastener C. In FIG. 6C, a first power wire 102 can be seen extending through a passageway P defined by female portion 142F of fastener C.

FIG. 6D is an exploded perspective view showing cord 136 coupled to first power wire 102A by fastener C. In the embodiment of FIG. 6D, first end 140A and second end 140B of cord 136A are fixed to male portion 142M of fastener C. In FIG. 6D, first power wire 102 can be seen extending through a passageway P defined by fastener C.

Figure 7B:
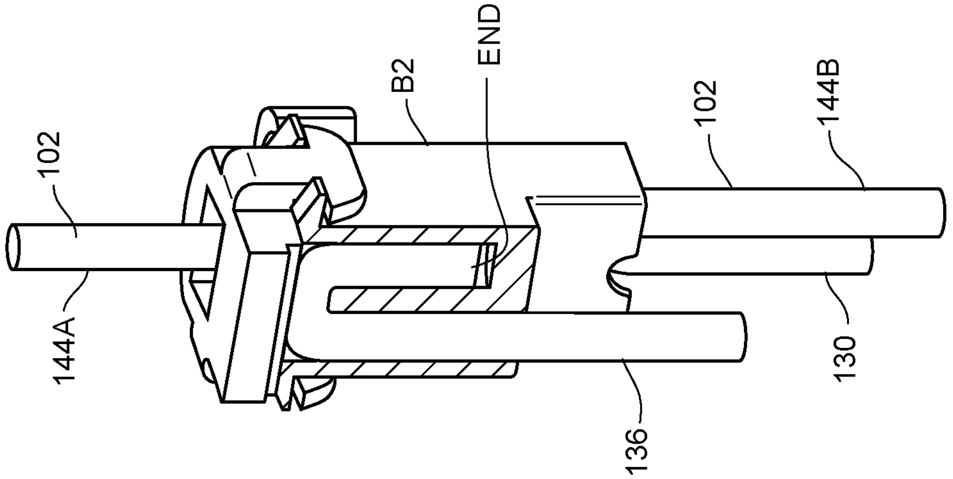
FIG. 7B is a perspective view showing a connector.
Figure 7A:
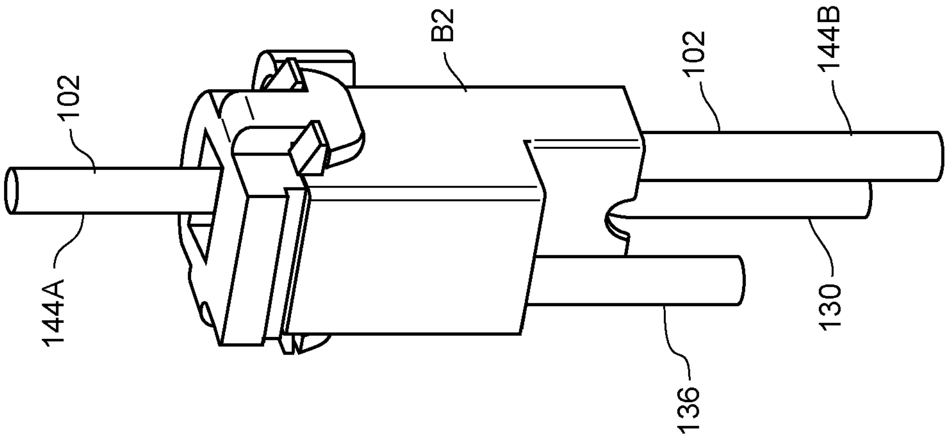
FIG. 7A is a perspective view showing a connector.

FIG. 7A is a perspective view showing a connector B2. In the embodiment of FIG. 7A, a first portion 144A of a power wire 102, a second portion 144B of power wire 102 and an intermediate wire 130 are electrically connected to each other by connector B2. The embodiment of FIG. 7A also includes a cord 136. In the embodiment of FIG. 7A, cord 136, first portion 144A of power wire 102, second portion 144B of power wire 102, and intermediate wire 130 are all mechanically coupled to each other by connector B2.

FIG. 7B is a perspective view showing a connector B2. In the embodiment of FIG. 7B, connector B2 is sectioned so that one end of cord 136 can be seen captured inside connector B2. In the embodiment of FIG. 7B, cord 136, first portion 144A of power wire 102, second portion 144B of power wire 102, and intermediate wire 130 are all mechanically coupled to each other by connector B2. First portion 144A of a power wire 102, a second portion 144B of power wire 102 and an intermediate wire 130 are electrically connected to each other by connector B2 in the embodiment of FIG. 7B.

Figure 8A:
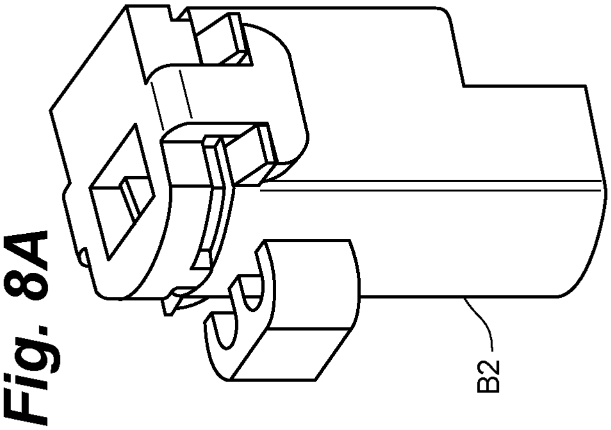
FIG. 8A is a perspective view showing an alternate embodiment of the connector shown in FIG. 7A and FIG. 7B.

FIG. 8A is a perspective view showing an alternate embodiment of connector B2 shown in FIG. 7A and FIG. 7B.

Figure 8B:
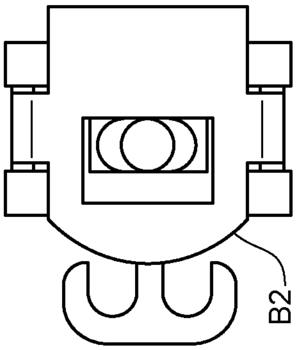
FIG. 8B is a plan view of the connector shown in FIG. 8A.

FIG. 8B is a plan view showing the connector B2 shown in FIG. 8A.

Figure 9A:
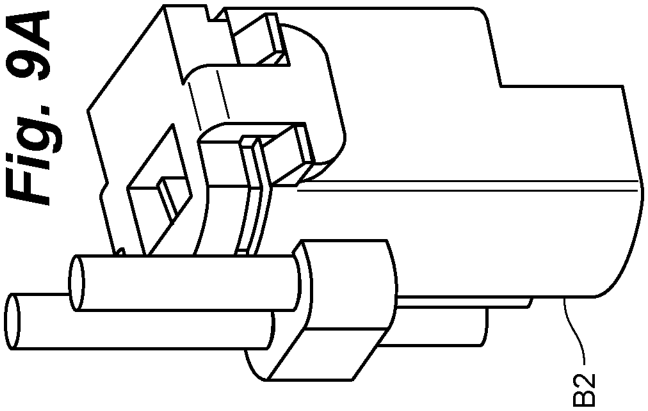
FIG. 9A is a perspective view showing an alternate embodiment of the connector shown in FIG. 7A and FIG. 7B.

FIG. 9A is a perspective view showing an alternate embodiment of connector B2 shown in FIG. 7A and FIG. 7B.

Figure 9B:
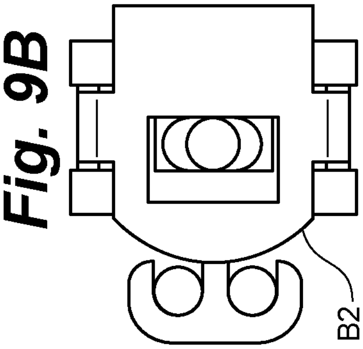
FIG. 9B is a plan view of the connector shown in FIG. 9A.

FIG. 9B is a plan view showing the connector B2 shown in FIG. 9A.

Figures 10A, 10B, 10C, 10D:
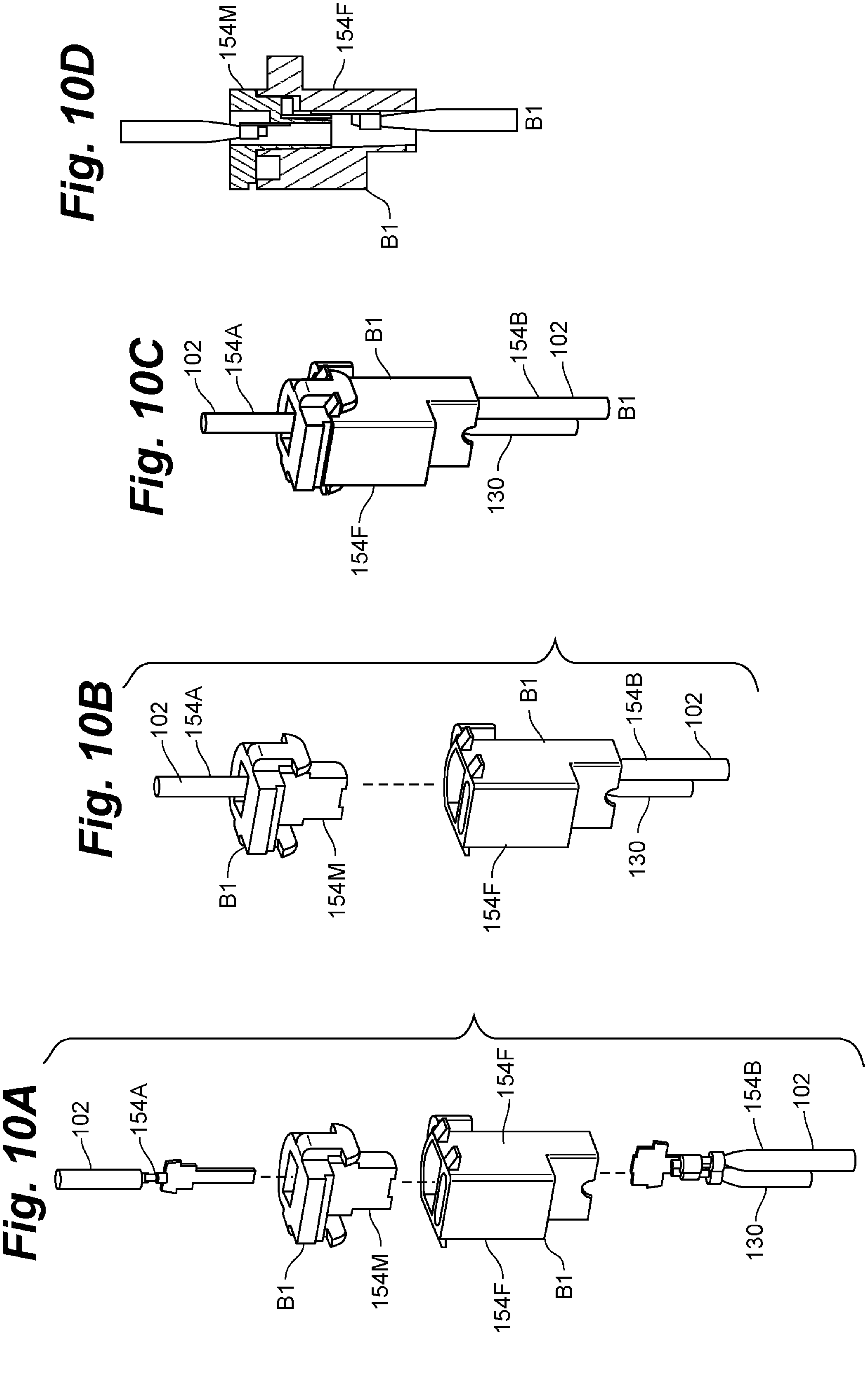
FIG. 10A is an exploded perspective view showing a male portion of a connector and a female portion of the connector, a first portion of a power wire, a second portion of the power wire and an intermediate wire.
FIG. 10B is a partially assembled perspective view showing the male portion of the connector and the female portion of the connector shown in FIG. 10B.
FIG. 10C is an assembled perspective view showing the male portion of the connector and the female portion of the connector shown in FIG. 10B.
FIG. 10D is a section view further illustrating the male portion of the connector and the female portion of the connector shown in FIG. 10B.

FIG. 10A is an exploded perspective view showing a male portion 154M of connector B1 and a female portion 152F of connector B1. A first portion 154A of a power wire 102, a second portion 154B of power wire 102 and an intermediate wire 130 are all illustrated in the exploded view of FIG. 10A.

FIG. 10B is a partially assembled perspective view showing male portion 154M of connector B1 and female portion 152F of connector B1. In the embodiment of FIG. 10B, first portion 154A of power wire 102 has been inserted into male portion 154M of connector B1. Also in the embodiment of FIG. 10B, a second portion 154B of power wire 102 and an intermediate wire 130 have been inserted into female portion 154F of connector B1.

FIG. 10C is an assembled perspective view showing a male portion 154M of connector B1 and a female portion 152F of connector B1. In the embodiment of FIG. 10C, male portion 154M of connector B1 has been inserted into female portion 152F of connector B1. First portion 154A of power wire 102, second portion 154B of power wire 102 and intermediate wire 130 all are electrically connected to each other by connector B2 in the embodiment of FIG. 10C. First portion 154A of power wire 102, second portion 154B of power wire 102, and intermediate wire 130 are also mechanically coupled to each other by connector B2 in the embodiment of FIG. 10C.

FIG. 10D is a section view further illustrating male portion 154M of connector B1 and female portion 152F of connector B1.

Figure 11:
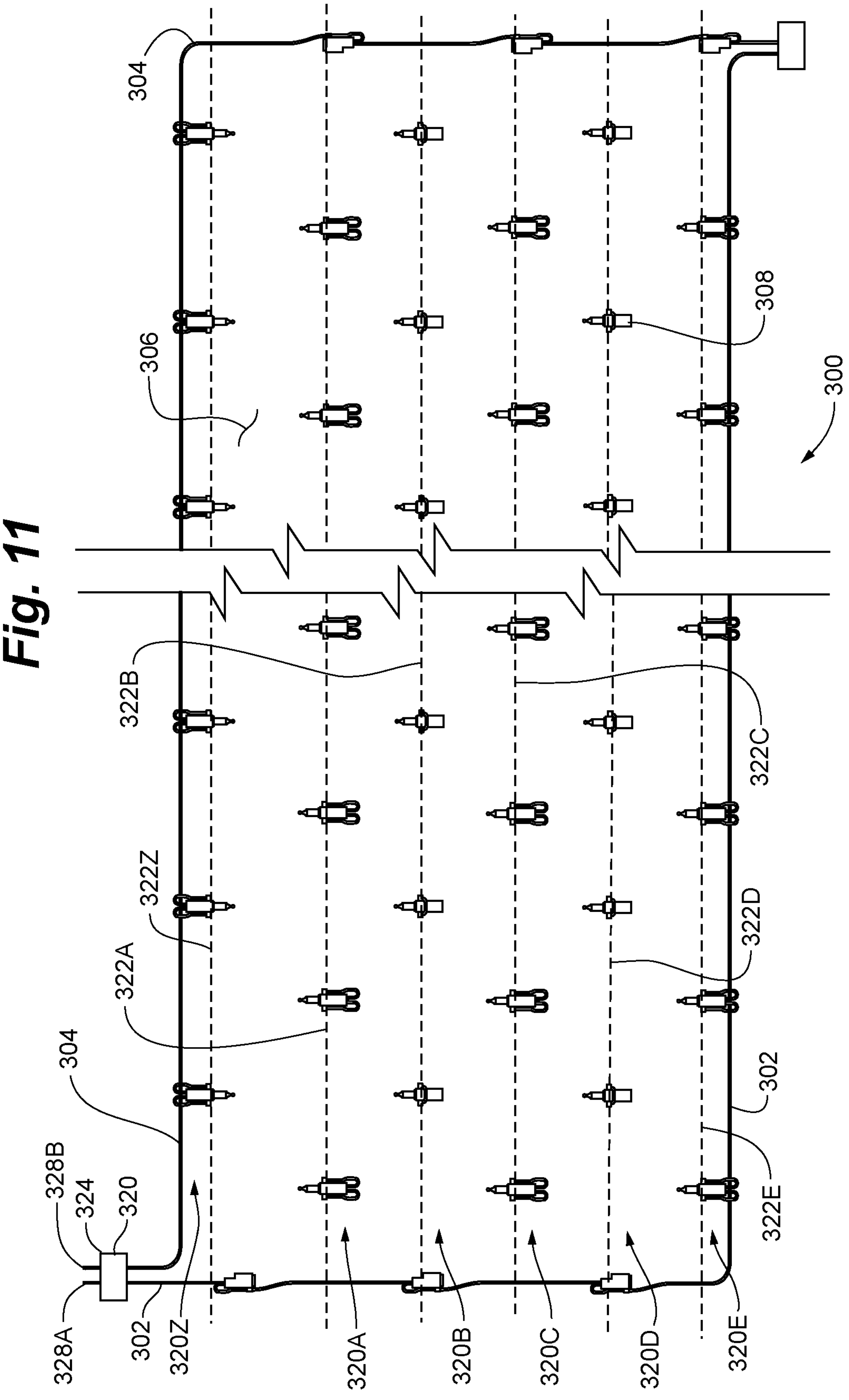
FIG. 11 is a plan view showing an illustrative embodiment of a decorative lighting assembly.

FIG. 11 is a plan view showing an illustrative embodiment of a decorative lighting assembly 300. Decorative lighting assembly 300 comprises a first power wire 302 and a second power wire 304. In FIG. 11, first power wire 302 and second power wire 304 are cooperating to surround a display area 306 of decorative lighting assembly 300. With reference to FIG. 11 it will be appreciated that decorative lighting assembly 300 includes a plurality of lamp assemblies 308 distributed across display area 306. The plurality of lamp assemblies 308 include a first row 320A of lamp assemblies 308 aligned along a first line 322A, a second row 320B of lamp assemblies 308 aligned along a second line 322B, and a third row 320C of lamp assemblies 308 aligned along a third line 322C.

A plurality of lamp assemblies 308 of decorative lighting assembly 300 may be inter-connected by wires to form one or more electrical circuits. A plurality of lamp assemblies 308 of decorative lighting assembly 300 may be mechanically coupled by cords which provide mechanical support. In some embodiments, the wires and the cords cooperate to form a net-like structure. In the embodiment of FIG. 11, the plurality of lamp assemblies 308 include a fourth row 320D of lamp assemblies 308 aligned along a first line 322D and a fifth row 320E of lamp assemblies 308 aligned along a fifth line 322E. The decorative lighting assembly 300 also includes a zeroth row 320Z of lamp assemblies 308 aligned along a zeroth line 322Z in the embodiment of FIG. 11.

Decorative lighting assembly 300 of FIG. 11 includes a power plug 324. Power plug 324 may comprise a traditional power plug comprising housing 326, first power terminal 328A and a second power terminal 328B for plugging into an outlet of an external power source, which may be an alternating-current (AC) power source. First power wire 302 is electrically connected to first power terminal 328A of power plug 324. Second power wire 304 is electrically connected to second power terminal 328B of power plug 324. In some embodiments, first power wire 302 and second power wire 304 may comprise a reinforced wire such as the reinforced wire described in issued U.S. Pat. No. 9,243,788, which is herein incorporated by reference in its entirety. Reinforced wire is depicted in FIGS. 19-22 and described herein.

With reference to FIG. 11, it will be appreciated that display area 306 of decorative lighting assembly 300 has a shape generally corresponding to a four-sided polygon. In the embodiment of FIG. 11, the shape of display area generally corresponds to a rectangle having a first long side, a second long side, a first short side, and a second short side. First power wire 302 defines the first short side and the first long side of a rectangle in the embodiment of FIG. 11. Second power wire 304 defines the second short side and the second long side of a rectangle in the embodiment of FIG. 11.

Figure 12:
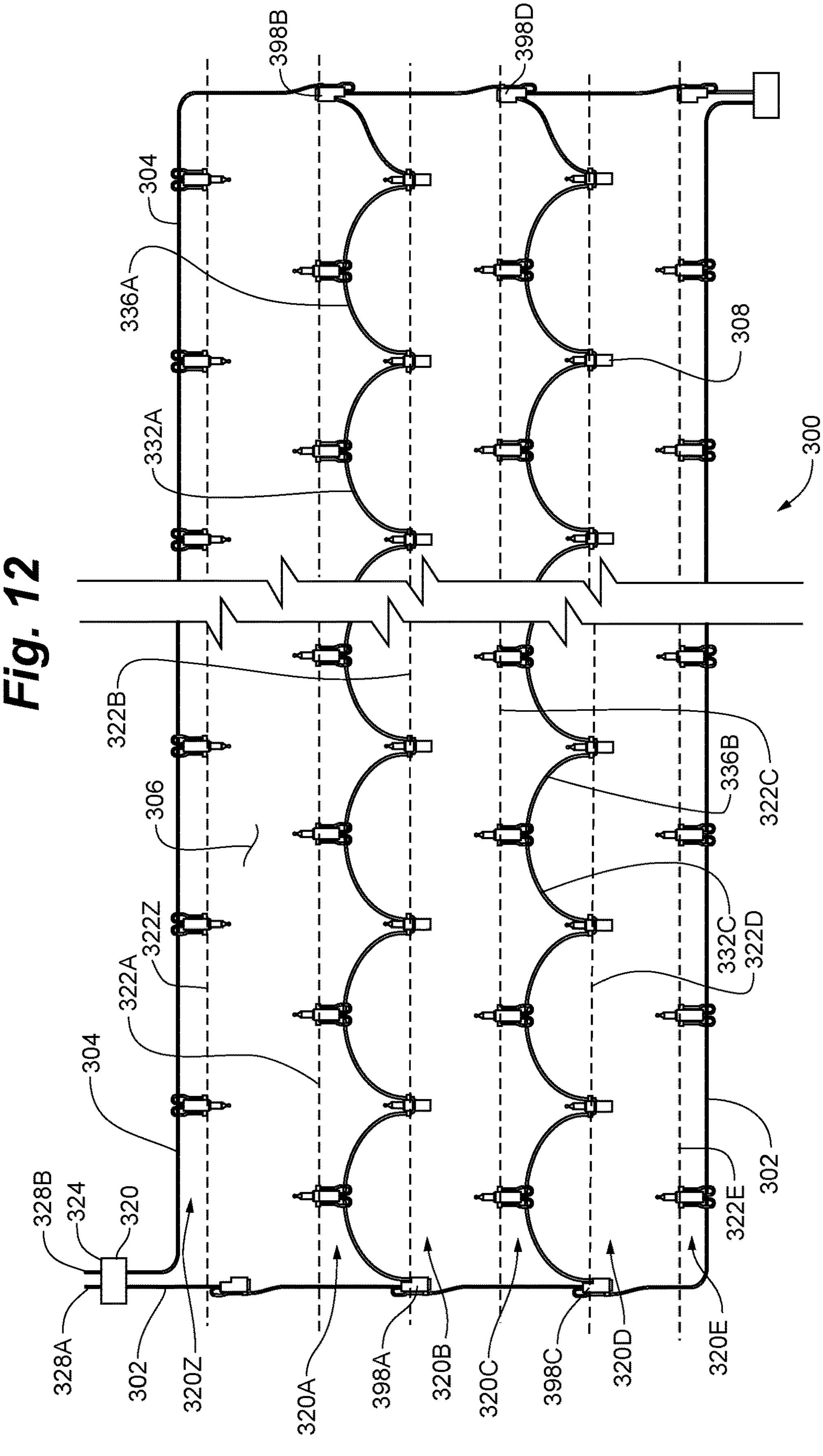
FIG. 12 is a plan view showing an additional illustrative embodiment of the decorative lighting assembly 300 shown in FIG. 11.

FIG. 12 is a plan view showing an additional illustrative embodiment of decorative lighting assembly 300 shown in the previous figure. Decorative lighting assembly 300 comprises a first power wire 302 and a second power wire 304. In FIG. 12, first power wire 302 and second power wire 304 are cooperating to surround a display area 306 of decorative lighting assembly 300. With reference to FIG. 12 it will be appreciated that decorative lighting assembly 300 includes a plurality of lamp assemblies 308 distributed across display area 306. The plurality of lamp assemblies 308 include a first row 320A of lamp assemblies 308, a second row 320B of lamp assemblies 308, a third row 320C of lamp assemblies 308, a fourth row 320 of lamp assemblies 308, and a fifth row 320E of lamp assemblies 308.

In the embodiment of FIG. 12, a plurality of lamp assemblies 308 of decorative lighting assembly 300 are mechanically coupled by cords 336 which provide mechanical support. In some embodiments, a plurality of lamp assemblies 308 of decorative lighting assembly 300 may be inter-connected by wires to form one or more electrical circuits. In some embodiments, the wires and the cords cooperate to form a net-like structure.

In the embodiment of FIG. 12, a first cord 336A is disposed along a first zig-zag path 332A mechanically coupling the lamp assemblies 308 in the first row 320A with the lamp assemblies 308 in the second row 320B. A second cord 336B is disposed along a third zig-zag path 332C mechanically coupling the lamp assemblies 308 in the third row 320C with the lamp assemblies in the fourth row 320D in the embodiment of FIG. 12. In some embodiments, each cord 336 comprises a plurality of cord segments.

In the embodiment of FIG. 12, a first connector 398A mechanically couples a first end of a first cord 336A to the first power wire 304 and a second connector 398B mechanically couples a second end of the first cord 336A to the second power wire 306. A third connector 398C mechanically couples a first end of the second cord 336B to the first power wire 304 and a fourth connector 398D mechanically couples a second end of the second cord 336B to the second power wire 306 in the embodiment of FIG. 12.

Figure 13:
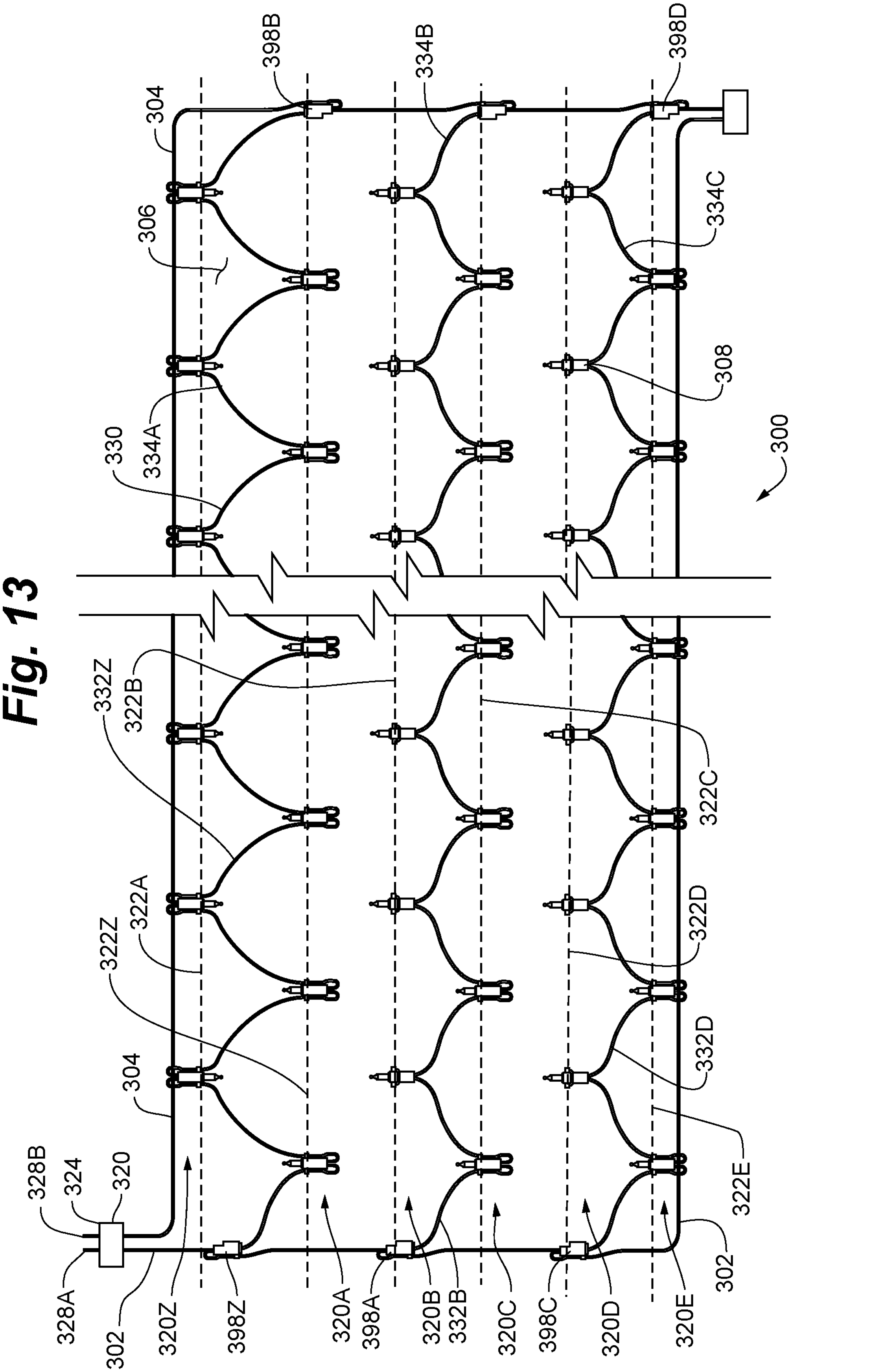
FIG. 13 is a plan view showing an additional illustrative embodiment of decorative lighting assembly 300 shown in FIGS. 11 and 12.

FIG. 13 is a plan view showing an additional illustrative embodiment of decorative lighting assembly 300 shown in the previous figure. Decorative lighting assembly 300 comprises a first power wire 302 and a second power wire 304. In FIG. 13, first power wire 302 and second power wire 304 are cooperating to surround a display area 306 of decorative lighting assembly 300. With reference to FIG. 13 it will be appreciated that decorative lighting assembly 300 includes a plurality of lamp assemblies 308 distributed across display area 306. The plurality of lamp assemblies 308 include a first row 320A of lamp assemblies 308, a second row 320B of lamp assemblies 308, a third row 320C of lamp assemblies 308, and a fourth row 320D of lamp assemblies 308.

In the embodiment of FIG. 13, a plurality of intermediate wires 330 are disposed along a zeroth zig-zag path 332Z connecting the lamp assemblies 308 in the zeroth row 320Z with the lamp assemblies 308 in the first row 320A. Also in the embodiment of FIG. 13, a plurality of intermediate wires 330 are disposed along a second zig-zag path 332B connecting the lamp assemblies 308 in the second row 320B with the lamp assemblies 308 in the third row 320C. A plurality of intermediate wires 330 disposed along a fourth zig-zag path 332D connecting the lamp assemblies 308 in the fourth row 320D with the lamp assemblies 308 in the fifth row 320E in the embodiment of FIG. 13.

In some embodiments, intermediate wires 330, first power wire 302 and second power wire 304 may comprise a reinforced wire such as the reinforced wire described in issued U.S. Pat. No. 9,243,788, which is herein incorporated by reference in its entirety. Reinforced wire is depicted in FIGS. 19-22 and described herein.

Decorative lighting assembly 300 of FIG. 13, includes a first series circuit 334A comprising a plurality of lamp assemblies 308 and intermediate wires 330 connected between the first power wire 304 and second power wire 306. In the embodiment of FIG. 13, the first series circuit 334A includes a plurality of intermediate wires 330 disposed along a zeroth zig-zag path 332Z connecting the lamp assemblies 308 in the zeroth row 320Z with the lamp assemblies 308 in the first row 320A. In the embodiment of FIG. 13, a zeroth connector 398Z electrically connects a first end of the first series circuit 334A to the first power wire 304 and a second connector 398B electrically connects a second end of the first series circuit 334A to the second power wire 306.

Decorative lighting assembly 300 of FIG. 13, also includes a second series circuit 334B comprising a plurality of lamp assemblies 308 and intermediate wires 330 connected between the first power wire 304 and second power wire 306. A third series circuit 334C of decorative lighting assembly 300 can also be seen in FIG. 13. The third series circuit 334C comprises a plurality of lamp assemblies 308 and intermediate wires 330 connected between the first power wire 304 and second power wire 306.

In the embodiment of FIG. 13, the second series circuit 334B includes a plurality of intermediate wires 330 disposed along the second zig-zag path 332B connecting the lamp assemblies 308 in the second row 320B with the lamp assemblies 308 in the third row 320C. In the embodiment of FIG. 13, the third series circuit 334C includes a plurality of intermediate wires 330 disposed along the fourth zig-zag path 332D connecting the lamp assemblies 308 in the fourth row 320D with the lamp assemblies 308 in the fifth row 320E. In the embodiment of FIG. 13, a first connector 398A electrically connects a first end of the second series circuit 334B to the first power wire 304 and a fourth connector 398D electrically connects a second end of the second series circuit 334B to the second power wire 306. In the embodiment of FIG. 13, a third connector 398C electrically connects a first end of the third series circuit 334B to the first power wire 304 and a fifth connector 398E electrically connects a second end of the third series circuit 334B to the second power wire 306.

Figure 14:
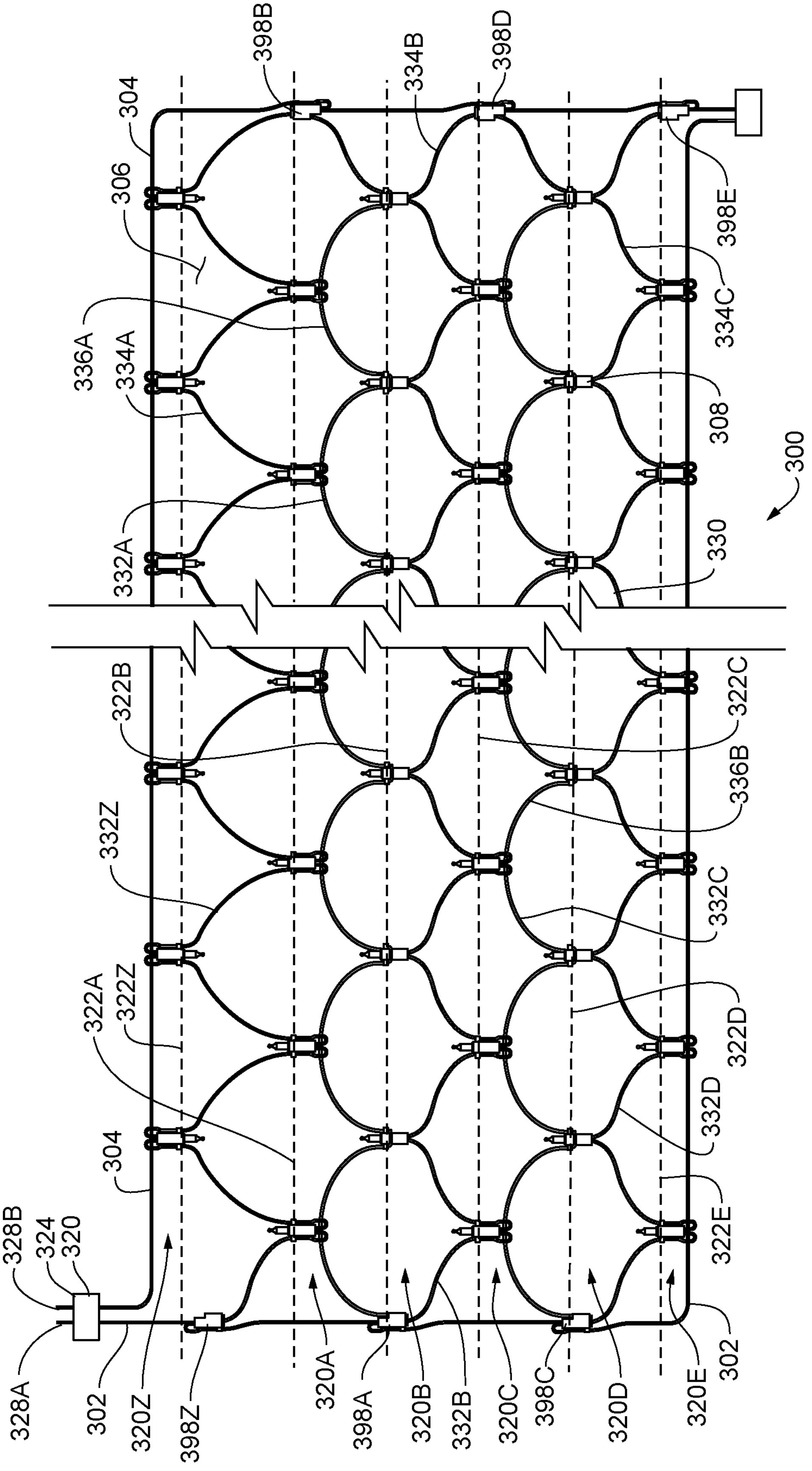
FIG. 14 is a plan view showing an additional illustrative embodiment of decorative lighting assembly 300 shown in FIGS. 11-13.

FIG. 14 is a plan view showing an additional illustrative embodiment of decorative lighting assembly 300 shown in the previous figure. Decorative lighting assembly 300 comprises a first power wire 302 and a second power wire 304. In FIG. 14, first power wire 302 and second power wire 304 are cooperating to surround a display area 306 of decorative lighting assembly 300. With reference to FIG. 14 it will be appreciated that decorative lighting assembly 300 includes a plurality of lamp assemblies 308 distributed across display area 306. The plurality of lamp assemblies 308 include a zeroth row 320Z of lamp assemblies 308, a first row 320A of lamp assemblies 308, a second row 320B of lamp assemblies 308, a third row 320C of lamp assemblies 308, a fourth row 320 of lamp assemblies 308, and a fifth row 320E of lamp assemblies 308.

In the embodiment of FIG. 14, a plurality of lamp assemblies 308 of decorative lighting assembly 300 are inter-connected by intermediate wires 330 to form electrical circuits. Also in the embodiment of FIG. 14, a plurality of lamp assemblies 308 of decorative lighting assembly 300 are mechanically coupled by cords 336 which provide mechanical support. In the embodiment of FIG. 14, the wires and the cords cooperate to form a net-like structure.

In the embodiment of FIG. 14, a plurality of intermediate wires 330 are disposed along a zeroth zig-zag path 332Z connecting the lamp assemblies 308 in the zeroth row 320Z with the lamp assemblies 308 in the first row 320A. A first cord 336A is disposed along a first zig-zag path 332A mechanically coupling the lamp assemblies 308 in the first row 320A with the lamp assemblies 308 in the second row 320B in the embodiment of FIG. 14. Also in the embodiment of FIG. 14, a plurality of intermediate wires 330 are disposed along a second zig-zag path 332B connecting the lamp assemblies 308 in the second row 320B with the lamp assemblies 308 in the third row 320C.

A second cord 336B is disposed along a third zig-zag path 332C mechanically coupling the lamp assemblies 308 in the third row 320C with the lamp assemblies in the fourth row 320D in the embodiment of FIG. 14. A plurality of intermediate wires 330 disposed along a fourth zig-zag path 332D connecting the lamp assemblies 308 in the fourth row 320D with the lamp assemblies 308 in the fifth row 320E in the embodiment of FIG. 14.

Decorative lighting assembly 300 of FIG. 14, includes a first series circuit 334A comprising a plurality of lamp assemblies 308 and intermediate wires 330 connected between the first power wire 304 and second power wire 306. In the embodiment of FIG. 14, the first series circuit 334A includes a plurality of intermediate wires 330 disposed along a zeroth zig-zag path 332Z connecting the lamp assemblies 308 in the zeroth row 320Z with the lamp assemblies 308 in the first row 320A. In the embodiment of FIG. 14, a zeroth connector 398Z electrically connects a first end of the first series circuit 334A to the first power wire 304 and a second connector 398B electrically connects a second end of the first series circuit 334A to the second power wire 306.

Decorative lighting assembly 300 of FIG. 14, also includes a second series circuit 334B comprising a plurality of lamp assemblies 308 and intermediate wires 330 connected between the first power wire 304 and second power wire 306. A third series circuit 334C of decorative lighting assembly 300 can also be seen in FIG. 14. The third series circuit 334C comprises a plurality of lamp assemblies 308 and intermediate wires 330 connected between the first power wire 304 and second power wire 306.

In the embodiment of FIG. 14, the second series circuit 334B includes a plurality of intermediate wires 330 disposed along the second zig-zag path 332B connecting the lamp assemblies 308 in the second row 320B with the lamp assemblies 308 in the third row 320C. In the embodiment of FIG. 14, the third series circuit 334C includes a plurality of intermediate wires 330 disposed along the fourth zig-zag path 332D connecting the lamp assemblies 308 in the fourth row 320D with the lamp assemblies 308 in the fifth row 320E. In the embodiment of FIG. 13, a first connector 398A electrically connects a first end of the second series circuit 334B to the first power wire 304 and a fourth connector 398D electrically connects a second end of the second series circuit 334B to the second power wire 306. In the embodiment of FIG. 13, a third connector 398C electrically connects a first end of the third series circuit 334B to the first power wire 304 and a fifth connector 398E electrically connects a second end of the third series circuit 334B to the second power wire 306.

Figure 15:
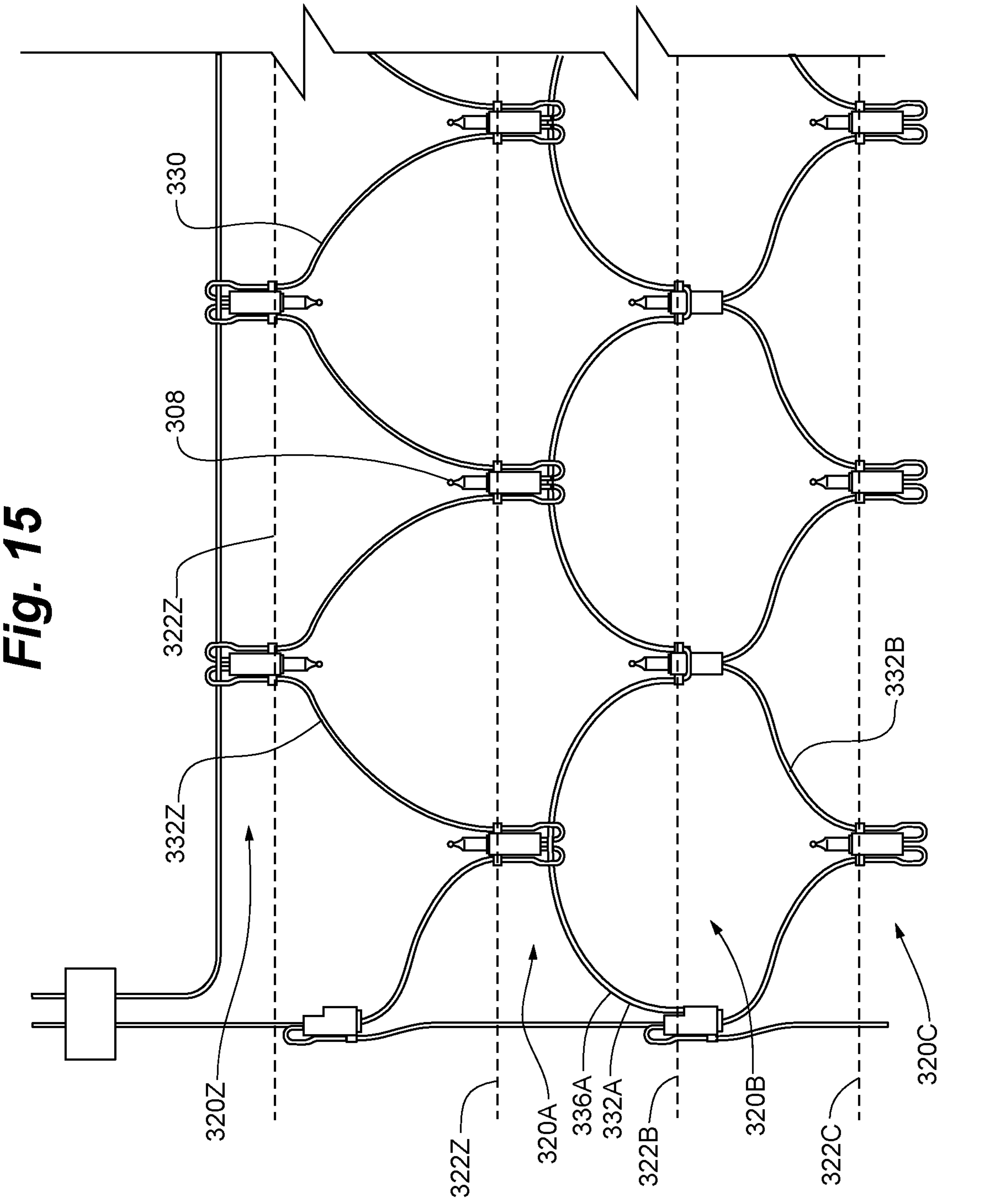
FIG. 15 is an enlarged plan view showing a portion of the decorative lighting assembly shown in FIG. 14.

FIG. 15 is an enlarged plan view showing a portion of the decorative lighting assembly 300 shown in the previous figure. The portion of decorative lighting assembly 300 shown in FIG. includes a zeroth row 320Z of lamp assemblies 308, a first row 320A of lamp assemblies 308, a second row 320B of lamp assemblies 308 and a third row 320C of lamp assemblies 308. In the embodiment of FIG. 15, a plurality of intermediate wires 330 are disposed along a zeroth zig-zag path 332Z connecting the lamp assemblies 308 in the zeroth row 320Z with the lamp assemblies 308 in the first row 320A. A first cord 336A is disposed along a first zig-zag path 332A mechanically coupling the lamp assemblies 308 in the first row 320A with the lamp assemblies 308 in the second row 320B in the embodiment of FIG. 15. Also in the embodiment of FIG. 15, a plurality of intermediate wires 330 are disposed along a second zig-zag path 332B connecting the lamp assemblies 308 in the second row 320B with the lamp assemblies 308 in the third row 320C.

With reference to FIG. 15, it will be appreciated that a first loop of wire is fixed to each of the lamp assemblies 308 in the first row 320A. A second loop of wire is also fixed to each of the lamp assemblies 308 in the first row 320A. In FIG. 15, the first cord 336A can be seen extending through the first and second loops of wire fixed to each of the lamp assemblies 308 in the second row first row 320A.

Figure 16:
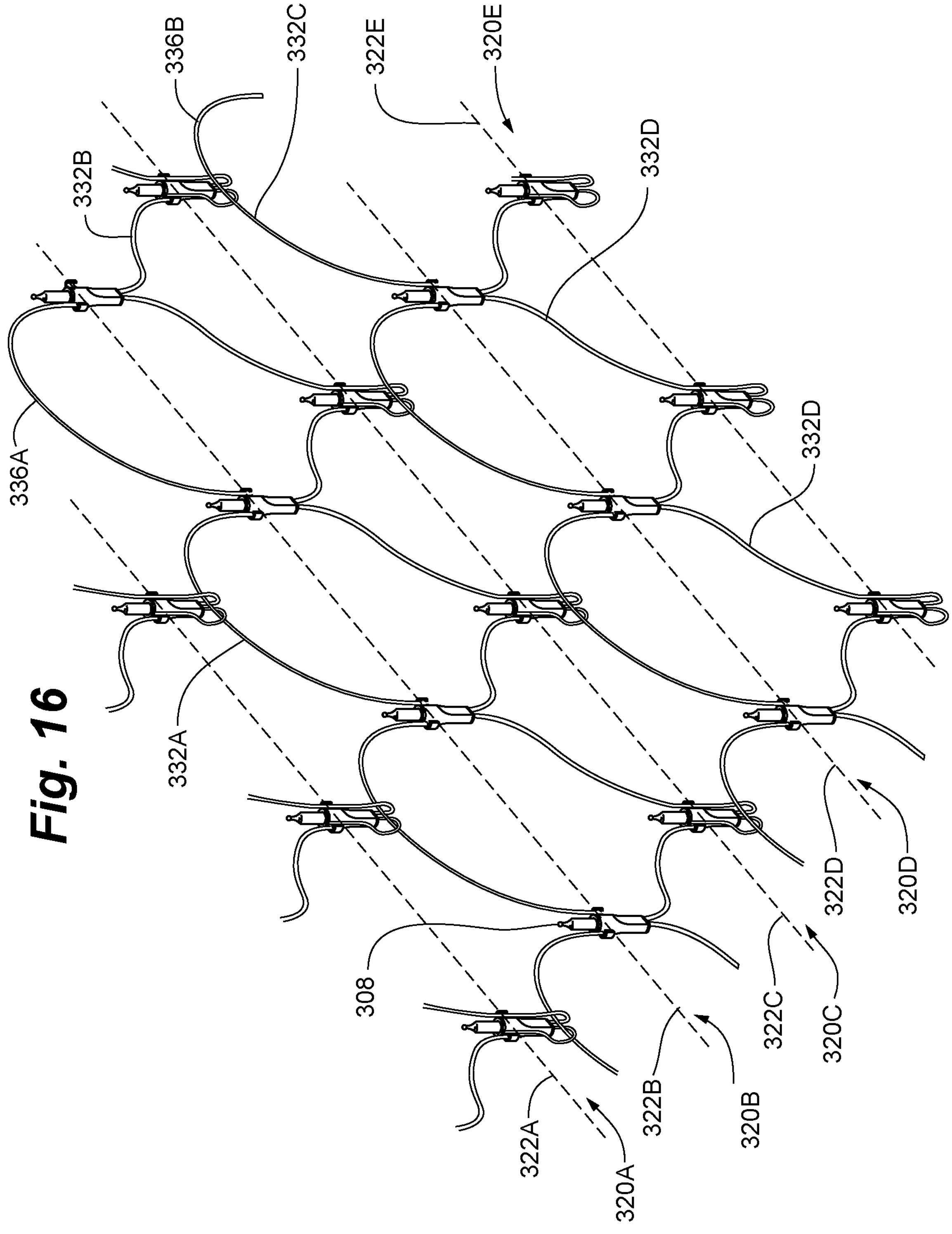
FIG. 16 is an enlarged perspective view further illustrating a portion of a decorative lighting assembly.

FIG. 16 is an enlarged perspective view further illustrating a portion of a decorative lighting assembly 300. The portion of decorative lighting assembly 300 shown in FIG. 16 includes a plurality of lamp assemblies 308 distributed across a display area 306. The plurality of lamp assemblies 308 include a first row 320A of lamp assemblies 308 aligned along a first line 322A, a second row 320B of lamp assemblies 308 aligned along a second line 322B, a third row 320C of lamp assemblies 308 aligned along a third line 322C, and a fourth row 320D of lamp assemblies 308 aligned along a fourth line 322D.

In the embodiment of FIG. 16, a plurality of intermediate wires 330 are disposed along a zeroth zig-zag path 332Z connecting the lamp assemblies 308 in the zeroth row 320Z with the lamp assemblies 308 in the first row 320A. A first cord 336A is disposed along a first zig-zag path 332A mechanically coupling the lamp assemblies 308 in the first row 320A with the lamp assemblies 308 in the second row 320B in the embodiment of FIG. 16. Also in the embodiment of FIG. 16, a plurality of intermediate wires 330 are disposed along a second zig-zag path 332B connecting the lamp assemblies 308 in the second row 320B with the lamp assemblies 308 in the third row 320C.

A second cord 336B is disposed along a third zig-zag path 332C mechanically coupling the lamp assemblies 308 in the third row 320C with the lamp assemblies in the fourth row 320D in the embodiment of FIG. 16. A plurality of intermediate wires 330 disposed along a fourth zig-zag path 332D connecting the lamp assemblies 308 in the fourth row 320D with the lamp assemblies 308 in the fifth row 320E in the embodiment of FIG. 16.

Figure 17B:
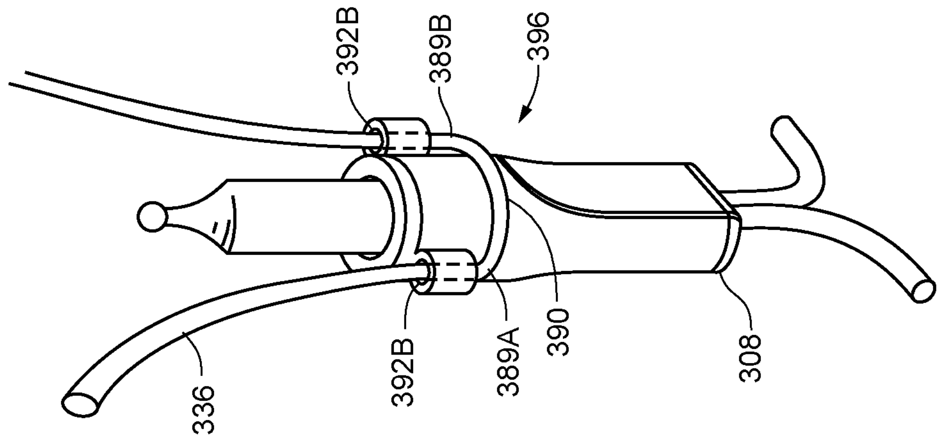
FIG. 17B is a perspective view showing another side of the lamp assembly shown in FIG. 17A.
Figure 17A:
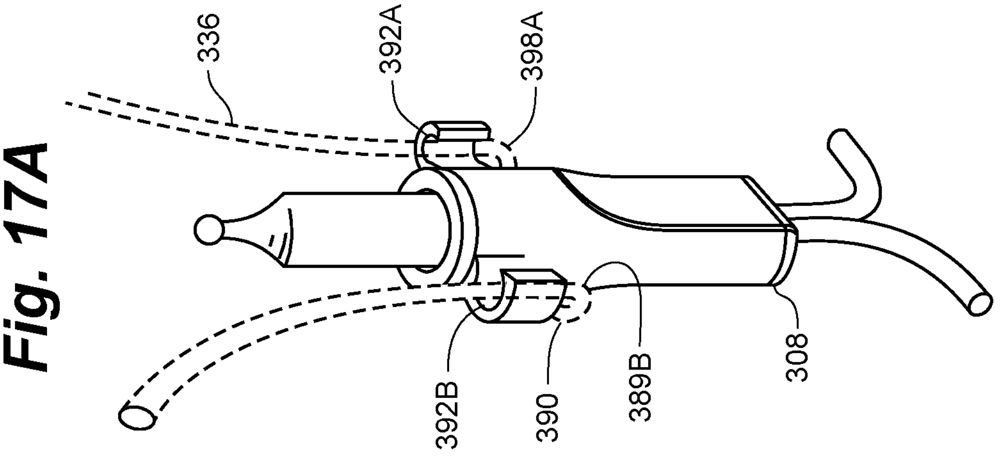
FIG. 17A is a perspective view showing one side of a lamp assembly.

FIG. 17A is a perspective view showing one side of a lamp assembly 308. FIG. 17B is a perspective view showing another side of the lamp assembly 308 shown in FIG. 17A. FIG. 17A and FIG. 17B may be collectively referred to as FIG. 17. A connection 396 is formed between the lamp assembly 308 and a cord 336. In the embodiment of FIG. 17, the connection 396 comprises a portion of the cord 336 that is extending through a tortuous path 394 defined by the lamp assembly 308. A portion of the cord 336 extends through a first lumen 392A and a second lumen 392B defined by the housing of the lamp assembly 308. A bight 390 of the cord 336 extends along the outside surface of the housing between the first lumen 392A and the second lumen 392B. A first bend 389A is formed in the cord 336 between the first lumen 392A and the bight 390. A second bend 389B is formed in the cord 336 between the second lumen 392B and the bight 390.

Figure 18B:
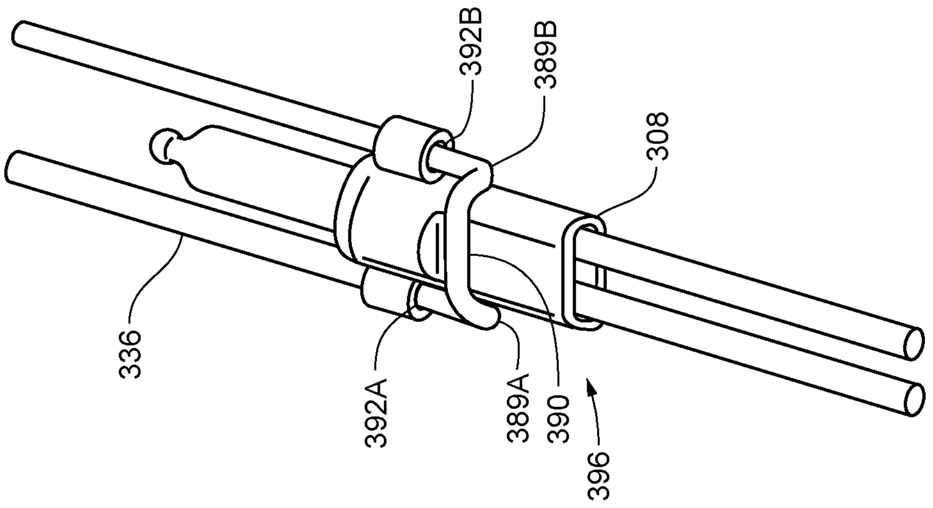
FIG. 18B is a perspective view showing another side of the lamp assembly shown in FIG. 18A.
Figure 18A:
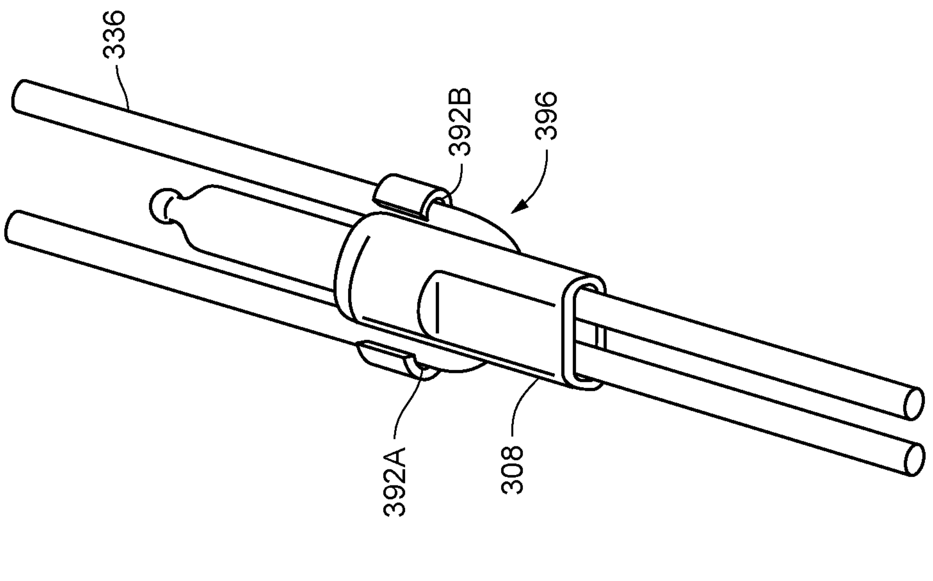
FIG. 18A is a perspective view showing one side of a lamp assembly.

FIG. 18A is a perspective view showing one side of a lamp assembly 308. FIG. 18B is a perspective view showing another side of the lamp assembly 308 shown in FIG. 18A. FIG. 18A and FIG. 18B may be collectively referred to as FIG. 18. A connection 396 is formed between the lamp assembly 308 and a cord 336. In the embodiment of FIG. 18, the connection 396 comprises a portion of the cord 336 that is extending through a tortuous path 394 defined by the lamp assembly 308. A portion of the cord 336 extends through a first lumen 392A and a second lumen 392B defined by the housing of the lamp assembly 308. A bight 390 of the cord 336 extends along the outside surface of the housing between the first lumen 392A and the second lumen 392B. A first bend 389A is formed in the cord 336 between the first lumen 392A and the bight 390. A second bend 389B is formed in the cord 336 between the second lumen 392B and the bight 390.

Figure 19:
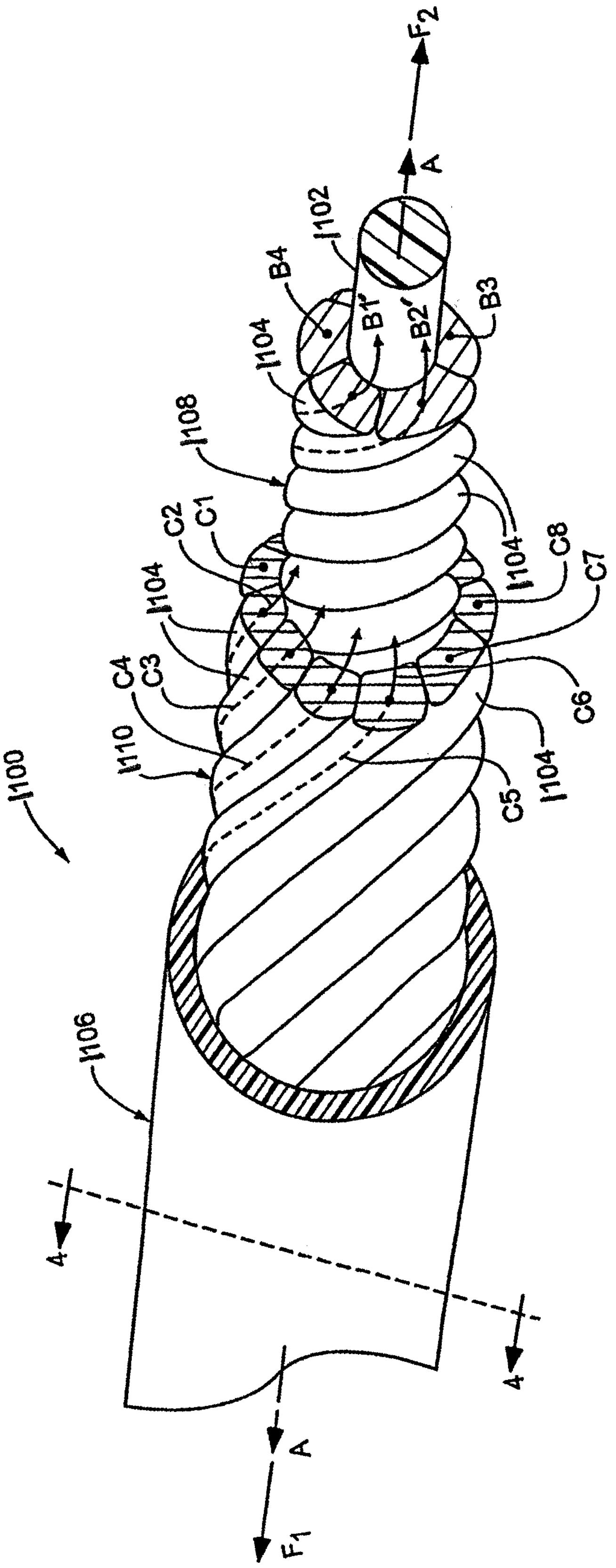
FIG. 19 is a perspective view of a reinforced decorative wire, according to an embodiment of the claimed invention.

Referring to FIG. 19, an embodiment of reinforced decorative-lighting wire or cord 1100 is depicted. In an embodiment, reinforced decorative-lighting wire 1100 includes one or more reinforcing strands or threads 1102, one or more conductor strands 1104, and insulating layer or jacket 1106. Conductor strands 1104 may form one or more layers, such as the depicted first conductor layer 1108 and second conductor layer 1110. As will be described further below, reinforcing strands 1102 and conductor strands 1104 may be arranged in a variety of manners, and in a variety of quantities, dependent upon a number of factors, including desired wire properties, including, but not limited to, tensile strength, resistivity and conductivity.

Reinforced decorative-lighting wire 1100 may comprise a variety of sizes, resistances, and ampacities, and may be described in terms of electrically-equivalent wire gauge standards, e.g., 20 AWG (American Wire Gauge), 22 AWG, 24 AWG, etc. For example, in an embodiment, wire 1100 may comprise a conductive equivalent to a wire normally described as a 22 AWG wire having an equivalent cross sectional area of conductive copper of approximately 0.326 mm2 and having a typical resistance of approximately 52.96 ohms/km, though the overall diameter of the complete wire may be greater than a standard 22 AWG wire due to the additional reinforcing strands.

Reinforced decorative-lighting wire 1100 may also be described in terms of other equivalent wire standards, such as Underwriter's Laboratories Standard UL 62 insofar as it pertains to decorative-lighting wire, including standards directed to Type XTW or Type CXTW as typically used in decorative-lighting applications. For example, an embodiment of a reinforced decorative-lighting wire 1100 may be designed to include characteristics equivalent to selected characteristics of an 18, 20 22, 25, or 25 AWG CXTW wire, particularly conductive characteristics such as DC resistance per conductor strand, and insulative characteristics.

As depicted in FIG. 19, an embodiment of reinforced decorative-lighting wire 1100 comprises a single reinforcing strand 1102, and multiple conductor strands 1104. In an embodiment, conductor strands 1104 form two layers: first conductor layer 1108 and second layer 1110, though it will be understood that conductors 1104 may form one, two, or more than two layers. Layers 1108 and 1110 form a stranded conductor of reinforced wire 1100. A reinforced wire 1100 having the stranded conductor comprising multiple conductor strands 1104 may also be referred to as a "single" conductor reinforced wire 1100 to differentiate from standard twisted pairs of wires typically used in decorative lighting. However, it will be understood that in some applications, pairs of single-conductor reinforced wires 1100 may be twisted about one another to form reinforced twisted-pair wire sets.

In an embodiment, and as depicted, reinforcing strand 1102 extends axially along a length of wire 1100, and along central wire Axis A, surrounded by, or adjacent to, conductor strands 1104. In an embodiment, reinforcing strand 1102 is generally located radially at a center of wire 1100.

Reinforcing strand 1102 may define a generally cylindrical shape defining a circular cross-sectional area, though the cross-sectional area may define other shapes, such as square, oval, rectangular, and so on. In other embodiments, and as will be described further below with respect to FIGS. 20B, reinforcing strand 1102 may define a generally circular cross-sectional shape prior to assembly into wire 1100, but then define a different, shape, such as an asymmetrical shape, after a manufacturing assembly process.

In an embodiment, central reinforcing strand 1102 comprises one or more fibers or strands of fibrous reinforcing material. In the depicted embodiment, reinforcing strand 1102 comprises a single strand or fiber of reinforcing material. In other embodiments, reinforcing strand 1102 comprises multiple strands of reinforcing material that may comprise twisted strands, threads or fibers such that reinforcing strand 1102 comprises a yarn of multiple strands or fibers.

In the embodiment depicted, reinforcing strand 1102 comprises a single 1500 Denier fiber having an outside diameter of approximately 0.45 mm. In another embodiment, reinforcing strand 1102 comprises a fiber ranging from 500 Denier to 2500 Denier. In other embodiments, reinforcing strand 1102 may comprise a larger or smaller diameter and/or greater or lesser Denier fiber depending on the properties of the reinforcing material and desired reinforcing properties. In an embodiment, reinforcing strand 1102 comprises a single or multi-fiber strand sized to be within the range of 1000 to 1500 Denier. Reinforced wire 1100 with reinforcing strands 1102 comprising such a size may provide appropriate reinforcing strength for wires 1100 that most decorative lighting applications that would typically use an 118-24 AWG standard wire.

The reinforcing material of reinforcing strand 1102 may comprise a generally non-conductive or nonmetallic material, such as a plastic or polymer, including a polyester or polyethylene (PE) material. In one such embodiment, reinforcing strand 1102 comprises a polyethylene terephthalate (PET) material. Other reinforcing materials may include, though will not be limited to, polystyrene, polyvinyl chloride (PVC), polyamide (PA), and so on. Reinforcing strand 1102 may consist entirely or substantially of a non-conductive or nonmetallic material, such as PET, though in some embodiments, reinforcing strand 1102 may comprise a composite material. Such a composite material may comprise a non-conductive material, such as PET, as well as some other conductive, partially-conductive, or other non-conductive material.

In an embodiment, and as depicted, reinforcing strand 1102 comprises a substantially solid structure in cross section (radially), as compared to a hollow core strand such as a pipe or other annular shape. Further, in an embodiment, reinforcing strand 1102 comprises the same material continuously along its axial length. In an embodiment, reinforcing strand 1102 may have a hardness that is less than a hardness of a conductor strand 1104. In an embodiment, reinforcing strand 1102 has a Rockwell hardness of R117.

In an embodiment, reinforcing strand 1102 comprises primarily a PET material, having a specific gravity ranging from 1380-1405 kg/m3, and a melting point of 200-250 degrees Celsius. In other embodiments, reinforcing strand 1102 comprises a polymer having a specific gravity that ranges from 1000-2000 kg/m3, and a melting point of 1150-300 degrees Celsius. Material in such a range may provide an appropriate balance of strength and flexibility for decorative light string applications. Further, as will be explained further below, such properties allow for deformation of reinforcing strand 1102 during the manufacturing assembly process.

In an embodiment, wherein reinforcing strand 1102 comprises primarily a PET material, strand 1102 comprises an elongation at break of 300%, or may comprise an elongation range of 200% to 400%, and a tensile strength of 55 MPa (7,977 psi). Herein, tensile strength refers to its ordinary meaning as understood in the field of conductive wires, including tensile strength being the maximum amount of stress that wire 1100 can withstand before failing or breaking, while being stretched or pulled axially along axis A (along a length of wire 1100) by opposing axial forces labeled F1 and F2 in FIG. 19.

In another embodiment wherein strand 1102 comprises a PET material, an elongation property of strand 1102 ranges from 200% to 400%, and a tensile strength ranges from 45 to 65 MPa. In an embodiment, the elongation of strand 1102 may be less than an elongation of conductor strand 1104. In another embodiment, the elongation of a strand 1102 may be approximately the same as, or greater than, a conductor strand 1104. In an embodiment, the tensile strength of a strand 1102 may be less than the tensile strength of a conductor strand 1104. In another embodiment, the tensile strength may be approximately the same as, or greater than, a conductor strand 1104. In an embodiment, the elongation of a strand 1102 may be less than the overall elongation of reinforced wire 1100. In another embodiment, the elongation may be approximately the same as, or greater than, reinforced wire 1100. In an embodiment, the tensile strength of a strand 1102 may be less than the overall tensile strength of reinforced wire 1100. In another embodiment, the tensile strength may be approximately the same as, or greater than, reinforced wire 1100.

Conductor strands 1104 may comprise any number of known conductive materials, including metals and metal alloys, such as copper, aluminum, steel, nickel, aluminum, and so on. Embodiments of alloys may include copper aluminum alloy, copper steel alloy, and so on. In an embodiment, one or more conductor strands comprise soft-annealed copper strands, which may be uncoated, or in some embodiments, coated with tin. Conductor strands 1104 comprised of copper, including comprised primarily of copper, provide not only superior tensile strength, but also superior ductility properties as compared to conductor strands 1104 comprising other metals, such as aluminum. A relatively higher ductility deriving from the use of copper conductor strands 1104, in combination with a polymer reinforcing strand 1102, allows deformation, particularly elongation when wire 1100 is subjected to tensile stress. Such a feature provides advantages in decorative lighting. In contrast, stranded conductors commonly used in overhead power line applications typically rely on aluminum conductors having low ductility, resulting in low elongation. In such an application, sagging of the heavy power lines/conductors is a concern, and the desirable low ductility or inability to elongate, is an important consideration. On the other hand, in decorative lighting, the ability of a wire to deform or elongate (relatively high ductility, e.g., the ductility of copper) may be advantageous. For example, when subjected to a tensile stress or force, wire 1100 may elongate rather than break, thereby preventing exposure of conductor strands 1104, and preventing a potentially hazardous situation. Elongation properties of reinforced decorative lighting wire 1100 are discussed further below.

Further, properties of high tensile strength, flexibility, and the ability to stretch or elongate when subjected to axial pulling may be advantageous for reinforced wire 1100 when applied to a decorative lighting apparatus. Unlike cables and wires used in overhead power transmission applications, wires used in decorative lighting applications tend to be supported over much of their length. For example, decorative light strings applied to trees, such as Christmas trees, are generally affixed to the branches of the tree and are well supported, with only very short runs of wire that are unsupported. Conversely, in overhead power transmission applications, extremely long lengths of wire are unsupported between power poles. Consequently, the materials and properties of cables and wires for such power transmission applications may be significantly different than those of reinforced decorative lighting wire 1100 as described herein.

In addition to ductility, tensile strength of conductor strands 1104 and associated conductor layers 1106 and 1108, as well as overall tensile strength of reinforced wire 1100 remains a consideration. In an embodiment of reinforced wire 1100 comprising soft-annealed copper conductor strands 1104, a tensile strength of each copper strand 1104 will have a higher tensile strength, for example, ranging from 200-250 N/mm2, as compared to aluminum alloys, for example, 100 N/mm2. In an embodiment, each conductor strand 1104 has a tensile strength that is less than a tensile strength of reinforcing strand 1102. In one such embodiment, conductor strands 1104 comprise a copper material, and reinforcing strand 1102 comprises PET.

In an embodiment, each conductor strand 1104 comprises a continuous, solid-core strand, though the entire wire 1100 comprises a multi-stranded wire. In other embodiments, each conductor strand 1104 may comprise multiple, individual strands. In an embodiment, all strands have approximately the same average diameter.

In a stranded conductor embodiment of wire 1100, individual conductor strands comprise 27 to 36 AWG copper conductor strands. In an embodiment, conductor strands comprise 27 AWG strands. In an embodiment, conductor strands comprise copper strands having diameters measuring, on average, 0.16 mm (34 AWG, or 0.16 AS). In other embodiments, copper strands comprise other diameters, including strands that have average diameters of 0.16 mm, or average diameters of approximately 0.16 mm, such as 0.16 mm+/−10%. In another embodiment, average diameters of copper strands used in a single wire 1100 range from 0.15 mm to 0.16 mm, or in another embodiment 0.25 mm+/−10%. In decorative lighting applications, a relatively wide range or tolerance in strand diameter may be sufficient due to a common practice of operating decorative light strands at currents significantly below maximum safe ampacity limits. Conductor strands 1104 may comprise copper strands complying with ASTM B 3-90 standards.

Conductor strands 1104 extend axially along Axis A, and may or may not be twisted about reinforcing strand 1102 or other conductor strands 1104.

Conductor strands 1104 may generally be cylindrical, presenting a generally circular cross section, though in other embodiments, each strand 1104 may present other cross-sectional shapes.

The number of conductor strands 1104 may vary based on a combination of factors, including desired conductive properties, and mechanical design characteristics. For example, for a 22 AWG equivalent wire, which in the decorative lighting industry may typically comprise 116 copper strands, reinforced decorative-lighting wire 1100 may also comprise 116 conductor strands. In another embodiment reinforced wire 1100 may be equivalent to 25 AWG in its current-carrying capability (maximum of 0.73 A), and may comprise 8 conductor strands, which in an embodiment comprises (8) 0.16 mm diameter strands. In other embodiments of 25 AWG equivalent wire, reinforced wire 1100 may include 8-10 conductor strands 1104; in an embodiment, each conductor strand 1104 may have a diameter averaging 0.16 mm, or alternatively, 0.157-0.154 mm.

In other embodiments of wire 1100, which in an embodiment may comprise 24 AWG equivalent wire, reinforced wire 1100 may include 8 conductor strands 1104; in an embodiment, each conductor strand 1104 may have a diameter averaging 0.16 mm, or alternatively, 0.157-0.154 mm.

In embodiments, the above configurations of strands 1104 may be combined with polymer reinforcing strands 1102 sized to fall within a range of 1000 to 1500 Denier.

The number of conductor strands 1104 may be greater or fewer than that of an equivalent wire having similar conductive properties, though it will be understood that particular embodiments of wire 1100 are intended to match the electrical or conductive properties of equivalent standard wires described by the American Wire Gauge standard, e.g., 22 AWG wire, such that even if the number of strands is not equal to the number of strands in an equivalent standard wire, the size of each conductor strand 1104 will be increased or decreased to maintain electrical equivalence. An embodiment of a reinforced decorative wire 1100 having electrical properties similar or equivalent to a 22 AWG wire will be described below to further clarify and emphasize the above.

Figure 20A:
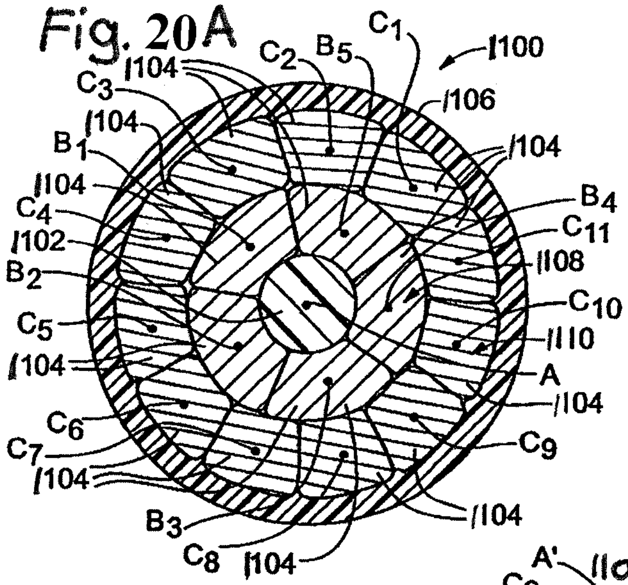
FIG. 20A is a cross-sectional view of the reinforced decorative wire of FIG. 19.
Figure 20B:
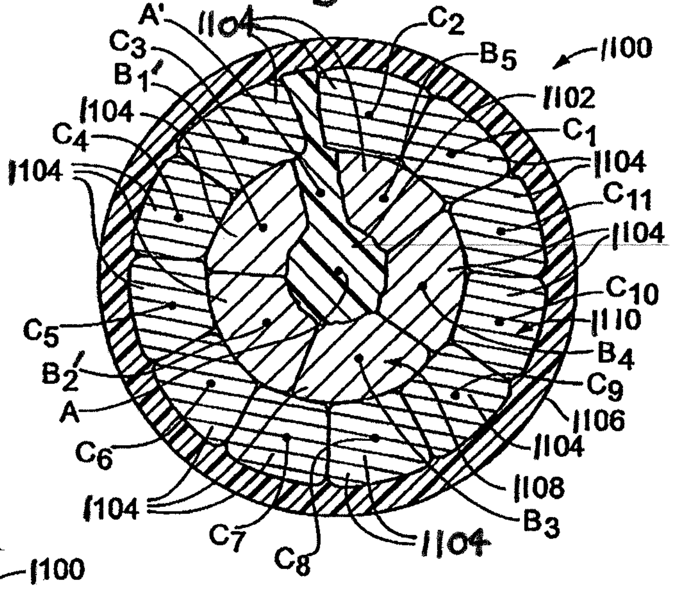
FIG. 20B is a cross-sectional view of the reinforced decorative wire of FIG. 19, depicting variations in conductor and strand position caused during manufacturing.

Referring also to FIG. 20A and FIG. 20B, in the embodiment depicted, first conductor layer 1108 is formed of multiple conductor strands 1104 twisted about centrally-positioned reinforcing fiber 1102. In the depicted embodiment, first conductor layer 1108 comprises five conductor strands 1104. In other embodiments, first conductor layer 1108 comprises more or fewer strands. In an embodiment, the number of strands 1104 in first conductor layer 1108 ranges from three strands to eight strands.

Strands 1104 extend axially along Axis A and in an embodiment, are twisted about reinforcing strand 1102. As depicted, strands 1104 are helically twisted about reinforcing strand 1102 in a counter-clockwise direction, though in other embodiments, strands 1104 may be twisted or wrapped about reinforcing wire 1102 in a clockwise direction.

Central axes of conductor strands 1104 are depicted in FIGS. 19, 20A and 20B by arrows B1'-B5 (first layer 1108) and C1-C11 (second layer 1110).

The twist or "pitch" of conductor strands 1104 may be defined by a "length of lay", or the length of conductor strand 1104 required to turn a full rotation, or turn 360 degrees. As compared to standard gauge wire having equivalent electrical properties, wire 1100 of the claimed invention may have lesser lengths of lay when the same number of conductor strands 1104 are used. For example, in an embodiment of a 22 AWG equivalent wire, a length of lay of a conductor strand 1104 of first layer 1108 is approximately 118.5 mm, as compared to approximately 32 mm for an equivalent standard 22 AWG wire commonly used for decorative lighting. The additional twists per unit of length, or decreased length of lay provides axial reinforcing strength in addition to the reinforcing strength added by reinforcing strands 1102.

Furthermore, the shorter length of lay may allow further stretching and elongation of wire 1100 without breakage when subjected to axial opposing forces, such as F1 and F2 as depicted in FIG. 19.

In an embodiment, conductor strands 1104 of layer 1108 each have an approximately equal length of lay, though in other embodiments, including some described further below, conductor strands 1104 may have different lengths of lay.

Additionally, unlike typical wires used in decorative lighting that comprise only conductive strands, i.e., no reinforcing strand, the use of one or more reinforcing strands 1102 in wire 1100 may allow for some slight radial compression of strands 1102 by conductor strands 1104 when wire 1100 is subjected to axial forces. This provides the added advantage of allowing wire 1100 to elongate even further than a typical decorative lighting wire of a similar wire gauge and ampacity.

Second conductor layer 1110 is formed on first conductor layer 1108, and also comprises a plurality of conductor strands 1104. In an embodiment, and as depicted, second conductor layer 1110 comprises eleven conductor strands 1104. In other embodiments, second conductor layer 1110 comprises more or fewer strands 1104. In an embodiment, the number of conductor strands 1104 in second layer 1110 ranges from four strands to 30 strands.

Strands 1104 extend axially along Axis A, and are adjacent strands 1104 of first layer 1108. In an embodiment, strands 1104 of second layer 1110 are adjacent to, and twisted about first layer 1108. As depicted, strands 1104 are twisted about layer 1108 and its strands 1104 in a counter-clockwise direction. As such, in an embodiment, conductor strands 1104 of second conductor layer 1110 twists in the same direction as the direction that conductor strands 1104 of second conductor layer 1108 twist. In other embodiments, strands 1104 may be twisted over layer 1108 in a clockwise direction, and may twist in a direction opposite to a twist direction of first conductor layer 1110. Strands 1104 forming conductor layer 1108 generally are positioned adjacent one another.

In an embodiment, conductor strands 1104 of layer 1110 each have an approximately equal length of lay, though in other embodiments, including some described further below, conductor strands 1104 may have different lengths of lay.

Insulating layer (or jacket) 1106 wraps about second conductive layer 1110, covering and insulating conductor strands 1104 and reinforcing strand 1102. Insulating layer 1106 may comprise any of a variety of known insulating materials, including polymers such as PVC, PE, thermoplastics, and so on. In addition to providing insulative properties, insulating layer 1106 may add mechanical strength through its other properties. In an embodiment, insulating layer 1106 has a minimum elongation percentage of 150%. In an embodiment, insulating layer 1106 comprises a polymer having a composition different than the polymer comprising reinforcing strand 1102.

Referring still to FIG. 39, in an embodiment, wire 1100 comprises a reinforced 22 AWG-electrically-equivalent wire comprising a single reinforcing strand 1102 extending axially along a center of wire 1100, surrounded by 116 twisted conductor strands 1104, and overlaid with an insulating jacket layer 1106. The 116 conductor strands 1104 comprise first conductive layer 1108, consisting of 5 conductive strands 1104, and second conductive layer 1110, consisting of 11 conductive strands 1104. In an embodiment, reinforcing strand 1102 comprises PET material in the form of a 11500 Denier strand; conductive strands 1104 comprise primarily copper; and insulating layer 1106 comprises PVC.

Each conductive strand 1104 defines an approximately 0.16 mm diameter, circular or round wire, such that the equivalent cross-sectional area of the conductive portion of wire 1100 is approximately the same as a standard 22 AWG wire, also denoted as 116/0.16 AS, meaning 116 strands of 0.16 mm diameter conductor strands. In this embodiment, the resistivity ranges from 54 to 57 ohms/km. In an embodiment, the resistivity is 56.8 ohms/km or less. In an embodiment, the resistivity is substantially 55 ohms/km.

The length of lay, sometimes referred to as lay of strand, of each conductor strand 1104 of first layer 1108, in an embodiment is 32 mm or less. In an embodiment, the length of lay of conductor strand 1104 of first layer 1108 ranges from 15 mm to 25 mm. In an embodiment, the length of lay of conductor strands 1104 of first layer 1108 is approximately 18.5 mm. In an embodiment the length of lay of all conductor strands 1104 of first layer 1108 are approximately the same. In an embodiment, a lineal length of each strand per unit length is within 5% of an average lineal length (note: the lineal length of a strand will be longer than a unit length due to the helical twisting of a wire, e.g., a 1 foot length of wire 1100 will include strands 1104 having lineal lengths longer than 1 ft. In other embodiments, the lineal length of individual strands 1104 may vary more substantially per unit length of wire 1100, particularly when lengths of lay of individual strands 1104 are allowed to vary from strand to strand.

The length of lay of conductor strands 1104 of second conductive layer 1110 may be the same as conductor strands 1104 of first conductor layer 1108, or in some embodiments, may be different. In an embodiment a length of lay of conductor strands 1104 of second layer 1110 is 32 mm or less. In an embodiment, the length of lay of conductor strand 1104 of second layer 1110 ranges from 15 mm to 25 mm. In an embodiment, the length of lay of conductor strands 1104 of second layer 1110 is substantially 18.5 mm. In an embodiment, lengths of lay of conductor strands 1104 of both layers 1108 and 1110 are, on average, approximately 18.5 mm. In an embodiment, the direction of twisting is the same, as depicted in FIG. 19.

In an embodiment, including an embodiment of 22 AWG reinforced wire 1100, insulation layer 1106, comprising primarily PVC material, has a minimum thickness of 0.69 mm. In an embodiment, insulation 1106 comprises a thickness ranging from 0.69 mm to 1.0 mm. In an embodiment, an average thickness of insulating layer 1106 has an average thickness of 0.76 mm or greater. In one such embodiment, insulating layer 1106 has an average thickness of 0.84. In an embodiment insulating layer 1106 has an insulation resistance of at least 225 MΩ/Kft.

In an embodiment, the overall diameter of wire 1100 in 22 AWG ranges from 2.40 to 2.70 mm. In an embodiment, an average overall diameter is approximately 2.6 mm; in an embodiment, an average overall wire 1100 diameter is 101 mil.

With respect to elongation, in an embodiment, wire 1100 has an elongation of 150% or greater. In an embodiment, the elongation of wire 1100 ranges from 150% to 400%. In one embodiment, wire 1100 exhibits 300% elongation, significantly longer than standard, all-copper multi-stranded 22 AWG CXTW wire.

With respect to tensile strength, embodiments of wire 1100 have an improved tensile strength, which in one embodiment includes a tensile strength of 1,500 PSI or greater. In an embodiment, the tensile strength ranges from 1,500 PSI to 4,000 PSI, in another embodiment, the tensile strength ranges from 2,500 to 3,500 PSI. Such a range may provide sufficient strength for various decorative lighting applications, including trees, net lights, sculptures, and so on. In some applications where wires are affixed tightly to supporting structure, such as trees of metal frames, a required tensile strength may be on the lower end of the range, while wires of light strings that are not affixed to, or are less supported, may require higher tensile strength due to possible pulling or yanking by a user.

Another method of describing and measuring “strength” of a wire, including a reinforced wire 1100, and as commonly used in decorative lighting is to measure an axially-applied pulling force required to cause the wire to begin to break, such that an outer insulation shows breakage, or an inner conductor shows breakage. In an embodiment, reinforced wire 1100 may withstand axial pulling forces of various ranges depending on the particular reinforced wire 1100 configuration.

In an embodiment, reinforced wire 1100 may withstand a minimum axially-applied pulling force ranging from 22 lbf to 46 lbf. In one such embodiment, reinforced wire 1100 comprises an ampacity equivalent to a 22 AWG wire, and can withstand a minimum 22.4 lbf without breaking; in another embodiment, reinforced wire 1100 comprises an ampacity equivalent to a 20 AWG wire, and can withstand a minimum 30 lbf without breaking; in another embodiment, reinforced wire 1100 comprises an ampacity equivalent to a 18 AWG wire, and can withstand a minimum 46 lbf without breaking.

In another embodiment, reinforced wire 1100 comprises 7-10 conductor strands 1104 defining a range of minimum axial pulling force ranging from 22.4 lbf to 46 lbf. In one such embodiment, reinforced wire 1100 comprises 8 conductor strands and has a minimum axial pulling force at breakage of 46 lbf; in one such embodiment, each conductor strand 1104 may have an average diameter in the range of 0.15 mm to 0.17 mm; alternatively, each conductor strand 1104 may have an average diameter of 0.154 mm to 0.157 mm. Such ranges accommodate expected current flows in various decorative lighting applications, while offering substantial overall tensile strength.

In an embodiment, wire 1100 includes a 1500 Denier PET reinforcing strand 1102 extending axially along Axis A, 16 copper conductor strands of 0.16 mm average diameter (5 first layer 1108 strands and 11 second layer 1110 strands) having a 55 Ω/km resistivity, and insulating layer 1106 of PVC material. In one such embodiment, elongation is greater than 300% (in an embodiment is 306%), with a tensile strength of 2800 PSI, requiring a force of approximately 21 kg to break. Such a wire may be used as a substitute for standard 22 AWG wire, including 22 AWG CXTW wire for improved decorative-lighting applications.

Referring to FIG. 20B, the wire 1100 of FIGS. 19 and 20A is depicted again, but in this case, the configuration of wire 1100, namely the relative positions of conductor strands 1104 and reinforcing strand 1102, are somewhat different. In an embodiment, because of the malleable properties of reinforcing strand 1102, including the fibrous nature, pliability, and so on, during manufacturing of wire 1100, reinforcing strand 1102 may be deformed somewhat, which in turn, may cause first and second layer strands 1108 and 1110 to move relative to one another, and relative to reinforcing strand 1102. As depicted in FIG. 20B, at a particular cross section, reinforcing strand 1102 does not comprise a circular cross section, but rather, comprises another shape due to deformation. Such “deformation”, may actually be the result of radial displacement of individual strands or fibers of reinforcing strand 1102 that occur when layers of conductor strands 1104 are wound or twisted about generally central reinforcing strand 1102. Such variation, may be caused by radial movement or deformation of reinforcing strand 1102 and may vary axially, or along a length of wire 1100. Consequently, while FIG. 20A depicts an ideal embodiment of wire 1100 in cross section, in other embodiments wire 1100 may comprise the relative structure depicted in FIG. 20B, or some other similar structure. As such, embodiments of reinforced decorative wire 1100 may include a central reinforcing strand that may only be substantially, or mostly centrally located. Further, in such an embodiment, conductor strands 1104 may not be evenly spaced about reinforcing strand 1102, as depicted, nor will strands 1104 of layer 1110 be evenly spaced about layer 1108.

As described above, embodiments of wire 1100 are not limited to the 1-5-11 configuration described above (1 reinforcing strand 1102, 5 first layer conductors 1105 and 11 second layer conductors 1110).

Although embodiments of reinforced wire 1100 may comprise multi-layer conductor strand embodiments, such as those depicted in FIGS. 19-20B, embodiments of reinforced wire 1100 may include only a single layer of conductor strands 1104 and a single reinforcing strand 1102. Some such embodiments will be further described below, and may include the following embodiments: 10 conductor strands 1104 with a single reinforcing strand 1102, which in an embodiment includes 0.15-0.16 mm diameter strands 1104 and 1000 Denier strand 1102; 9 conductor strands 1104 with a single reinforcing strand 1102, which in an embodiment includes 0.15-0.16 mm diameter strands 1104 and 1000 Denier strand 1102; 8 conductor strands 1104 with a single reinforcing strand 1102, which in an embodiment includes 0.15-0.16 mm diameter strands 1104 and 1500 Denier strand 1102; and 7 conductor strands 1104 with a single reinforcing strand 1102, which in an embodiment includes 0.15-0.16 mm diameter strands 1104 and 1500 Denier strand 1102. In some such 7, 8, 9, or 110 stranded embodiments, when fewer conductor strands 1104 are used, a larger diameter and stronger reinforcing strand 1102 may be included to make up for the decrease in tensile strength due to fewer conductor strands 1104.

Figure 21:
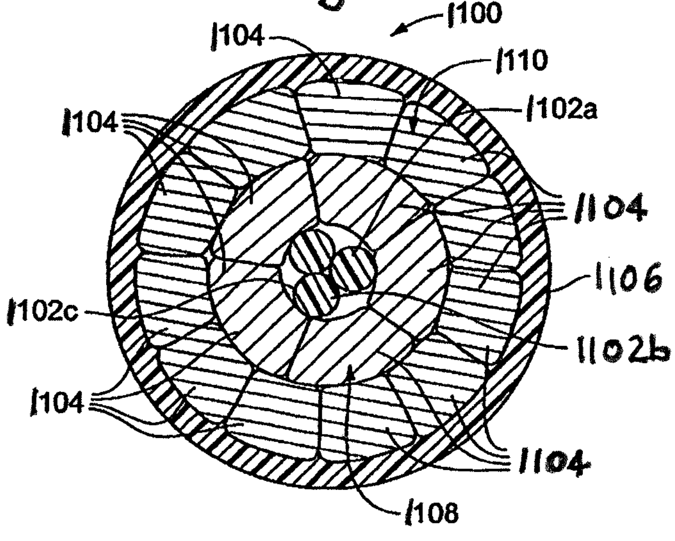
FIG. 21 is a cross-sectional view of another embodiment of a reinforced decorative wire, according to an embodiment of the claimed invention.

Referring to FIG. 21, another embodiment of reinforced decorative-lighting wire 1100 is depicted. This alternate embodiment of wire 1100 is substantially the same as the embodiment depicted in FIGS. 19, 20A and 20B, and described above, with the exception of reinforcing strands 1102. In this embodiment, rather than a single reinforcing strand 1102, wire 1100 includes three reinforcing strands 1102*a*, 1102*b*, and 1102*c*. Reinforcing strands 1102*a*-102*c* extend axially through the center portion of wire 1102. Strands 1102*a*-102*c* may or may not be twisted about one another. Twisting multiple strands 1102 may provide an additional reinforcing strength.

In an embodiment, fewer than three strands 1102, namely two strands may be used. In other embodiments, greater than three strands 1102 may be used.

In an embodiment, the cross-sectional area of the three reinforcing strands 1102*a*, 1102*b*, and 1102*c* is equivalent to the 1500 Denier strand described above with respect to the embodiment of FIGS. 19, 20A and 20B. In other embodiments, the size of reinforcing strands 1102 may be larger or smaller, depending on desired wire 1100 strength, with larger size strands and/or more strands 1102 being used for stronger reinforced wire 1100.

Figure 22:
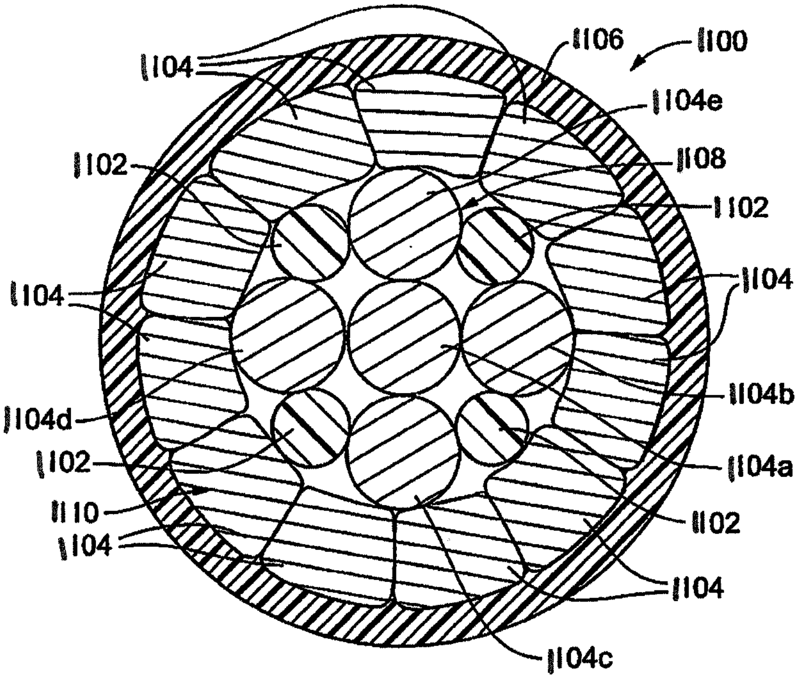
FIG. 22 is a cross-sectional view of another embodiment of a reinforced decorative wire, according to an embodiment of the invention.

Referring to FIG. 22, another embodiment of wire 1100 is depicted. In this embodiment, wire 1100 still includes multiple reinforcing strands 1102, first conductor layer 1108 comprising multiple conductors 1104, second conductor layer 1110 comprising multiple conductors 1104, and outer insulating layer 1106. In the depicted embodiment, first conductor layer 1108 includes five conductors 1104 and second conductor layer 1110 includes eleven conductors 1104, similar to the embodiments described above with respect to FIGS. 19-21. However, in this embodiment, wire 1100 includes four reinforcing strands 1102.

As depicted, first conductor layer 1108 actually includes a single, central conductor 1104*a* surrounded by four outer conductors 1104*b*, 1104*c*, 1104*d*, and 1104*e*. Between each outer conductor 1104*b*, 1104*c*, 1104*d* and 1104*f* is a reinforcing strand 1102. Second conductor layer 1110 is adjacent both the four conductors 1104*b-e*, and the four reinforcing strands 1102.

Embodiments of the invention are not intended to be limited to the specific patterns and structures depicted in FIGS. 19-22. It will be understood that the number of conductors 1104, number of reinforcing strands 1102, and their combinations, may vary.

As described above, embodiments of the disclosure include a number of decorative lighting assemblies that are tangle resistant and easier to manufacture as compared to known decorative lighting structures. Various embodiments include, but are not limited to the following embodiments:

Embodiment 1. A decorative lighting assembly, comprising:
- a first power wire electrically connected to a first power contact;
- a second power wire electrically connected to a second power contact;
- the first power wire and the second power wire cooperating to surround a display area of the decorative lighting assembly;
- a plurality of lamp assemblies distributed across the display area, the plurality of lamp assemblies including a first row of lamp assemblies aligned along a first line, a second row of lamp assemblies aligned along a second line, a third row of lamp assemblies aligned along a third line, and a fourth row of lamp assemblies aligned along a fourth line;
- a first cord disposed along a first zig-zag path mechanically coupling the lamp assemblies in the first row with the lamp assemblies in the second row;
- a plurality of intermediate wires disposed along a second zig-zag path mechanically coupling and electrically connecting the lamp assemblies in the second row with the lamp assemblies in the third row; and
- a second cord disposed along a third zig-zag path mechanically coupling the lamp assemblies in the third row with the lamp assemblies in the fourth row.

Embodiment 2. The decorative lighting assembly of Embodiment 1, wherein the display area has a shape generally corresponding to a four-sided polygon.

Embodiment 3. The decorative lighting assembly of Embodiment 2, wherein the shape of the display area generally corresponds to a rectangle having a first long side, a second long side, a first short side, and a second short side.

Embodiment 4. The decorative lighting assembly of Embodiment 3, wherein:
- the first power wire defines the first short side and the first long side of the rectangle; and the second power wire defines the second short side and the second long side of the rectangle.

Embodiment 5. The decorative lighting assembly of Embodiment 1, further comprising a fifth row of lamp assemblies aligned along a fifth line and a plurality of intermediate wires disposed along a zig-zag path connecting the lamp assemblies in the fourth row with the lamp assemblies in the fifth row.

Embodiment 6. The decorative lighting assembly of Embodiment 1, further comprising a zeroth row of lamp assemblies aligned along a zeroth line and a plurality of intermediate wires disposed along a zeroth zig-zag path connecting the lamp assemblies in the zeroth row with the lamp assemblies in the first row.

Embodiment 7. The decorative lighting assembly of Embodiment 1, further comprising a first connector that mechanically couples a first end of a cord to the first power wire and a second connector that mechanically couples a second end of the cord to the second power wire.

Embodiment 8. The decorative lighting assembly of Embodiment 7, wherein the first connector forms an electrical connection between two portions of the first power wire and the second connector forms an electrical connection between two portions of the second power wire.

Embodiment 9. The decorative lighting assembly of Embodiment 1, wherein the first power wire and the second power wire comprise reinforced wire.

Embodiment 10. The decorative lighting assembly of Embodiment 9, wherein the intermediate wires comprise reinforced wire.

Embodiment 11. The decorative lighting assembly of Embodiment 10, wherein the reinforced wire comprises:
- a longitudinally-extending reinforcing strand, the reinforcing strand comprising one or more fibers comprising a polymer material;
- a plurality of conductor strands wound about the reinforcing strand; and
- an outer insulating layer adjacent to, and covering, one or more of the conductor strands.

Embodiment 12. The decorative lighting assembly of Embodiment 1, wherein:
- the first power wire comprises 18 AWG wire;
- the second power wire comprises 18 AWG wire; and
- the intermediate wires comprise 22 AWG wire.

Embodiment 13. The decorative lighting assembly of Embodiment 1, wherein:
- the first power wire comprises 18 AWG wire;
- the second power wire comprises 18 AWG wire; and
- the intermediate wires comprise 22 AWG reinforced wire.

Embodiment 14. The decorative lighting assembly of Embodiment 1, wherein:
- the first power wire comprises 18 AWG wire;
- the second power wire comprises 18 AWG wire; and
- the intermediate wires comprise 25 AWG reinforced wire.

Embodiment 15. The decorative lighting assembly of Embodiment 1, wherein:
- the intermediate wires have a first outer diameter;
- the at least one cord has a second outer diameter; and
- the second outer diameter is substantially equal to the first outer diameter so that the decorative lighting assembly has a uniform appearance.

Embodiment 16. The decorative lighting assembly of Embodiment 1, wherein:
- the intermediate wires comprise a plurality of conductor strands and an outer insulating layer adjacent to, and covering, one or more of the conductor strands;
- the at least one cord comprises a solid strand; and the insulating layer of the intermediate wires and the solid strand comprise the same material so that the decorative lighting assembly has a uniform appearance.

Embodiment 17. The decorative lighting assembly of Embodiment 1, wherein:

the intermediate wires comprise a plurality of conductor strands and an outer insulating layer adjacent to, and covering, one or more of the conductor strands;

the at least one cord comprises a solid strand; and the insulating layer of the intermediate wires and the solid strand are substantially the same color so that the decorative lighting assembly has a uniform appearance.

Embodiment 18. The decorative lighting assembly of Embodiment 1, wherein a first series circuit of the decorative lighting assembly comprises:

a first lamp assembly electrically connected to the first power wire;

an nth lamp assembly connected to the second power wire; and a plurality of intermediate lamp assemblies electrically connected in series between the first lamp assembly and the nth lamp assembly.

Embodiment 19. The decorative lighting assembly of Embodiment 18, further comprising a first connector electrically connecting a first end of the series circuit to the first power wire.

Embodiment 20. The decorative lighting assembly of Embodiment 19, further comprising a second connector electrically connecting a second end of the series circuit to the second power wire.

Embodiment 21. The decorative lighting assembly of Embodiment 20, wherein the second connector mechanically couples one end of a cord to the second power wire.

Embodiment 22. The decorative lighting assembly of Embodiment 21, wherein the first series circuit follows a winding path between the first connector and the second connector so that the lamp assemblies are distributed across a portion of the display area.

Embodiment 23. The decorative lighting assembly of Embodiment 22, wherein the winding path of the first series circuit comprises the plurality of intermediate wires disposed along the first zig-zag path connecting the lamp assemblies in the first row with the lamp assemblies in the second row.

Embodiment 24. The decorative lighting assembly of Embodiment 23, wherein at least one cord extends between pairs of lamp assemblies that are adjacent to one another physically and are not adjacent to one another in the first series circuit.

Embodiment 25. The decorative lighting assembly of Embodiment 1, wherein the at least one cord forms a connection with each of the lamp assemblies in the second row, each connection comprising a portion of the at least one cord extending through a loop.

Embodiment 26. The decorative lighting assembly of Embodiment 1, wherein a loop of wire is fixed to each of the lamp assemblies in the second row and the at least one cord extends through the loop of wire fixed to each of the lamp assemblies in the second row.

Embodiment 25. The decorative lighting assembly of Embodiment 1, wherein the at least one cord forms a connection with each of the lamp assemblies in the second row, each connection comprising a tortuous path defined by each lamp assembly and a portion of the at least one cord extending through the tortuous path.

Embodiment 26. The decorative lighting assembly of Embodiment 25, wherein the portion of the at least one cord extends through a first eye defined by a lamp holder of each lamp assembly and a second eye defined by a lamp holder of each lamp assembly.

Embodiment 27. The decorative lighting assembly of Embodiment 26, wherein a bight of the portion of the at least one cord extends along an outer surface of the lamp holder between the first eye and the second eye.

Embodiment 28. The decorative lighting assembly of Embodiment 27, wherein the portion of the at least one cord includes a first bend disposed between the first eye and the bight.

Embodiment 29. The decorative lighting assembly of Embodiment 27, wherein the portion of the at least one cord includes a second bend disposed between the second eye and the bight.

Embodiment 31. A decorative lighting assembly, comprising:

a first power wire electrically connected to a first power contact;

a second power wire electrically connected to a second power contact;

the first power wire and the second power wire cooperating to surround a display area of the decorative lighting assembly;

a plurality of lamp assemblies distributed across the display area, the plurality of lamp assemblies including a first column of lamp assemblies aligned along a first line, a second column of lamp assemblies aligned along a second line, a third column of lamp assemblies aligned along a third line, and a fourth column of lamp assemblies aligned along a fourth line;

a plurality of intermediate wires disposed along a first zig-zag path connecting the lamp assemblies in the first column with the lamp assemblies in the second column;

at least one cord disposed along a second zig-zag path connecting the lamp assemblies in the second column with the lamp assemblies in the third column; and a plurality of intermediate wires disposed along a third zig-zag path connecting the lamp assemblies in the third column with the lamp assemblies in the fourth column.

Embodiment 32. The decorative lighting assembly of Embodiment 31, wherein the display area has a shape generally corresponding to a four-sided polygon.

Embodiment 33. The decorative lighting assembly of Embodiment 32, wherein the shape of the display area generally corresponds to a rectangle having a first long side, a second long side, a first short side, and a second short side.

Embodiment 34. The decorative lighting assembly of Embodiment 33, wherein:

the first power wire defines the first short side, the first long side, and the second short side of the rectangle; and the second power wire defines the second long side of the rectangle.

Embodiment 35. The decorative lighting assembly of Embodiment 31, further comprising a fifth column of lamp assemblies aligned along a fifth line; and wherein the at least one cord is disposed along a fourth zig-zag path connecting the lamp assemblies in the fourth column with the lamp assemblies in the fifth column.

Embodiment 36. The decorative lighting assembly of Embodiment 35, wherein the at least one cord comprises a single cord that extends through both the first zig-zag path and the fourth zig-zag path.

Embodiment 37. The decorative lighting assembly of Embodiment 36, further comprising a first fastener that mechanically couples a first end of the single cord and a second end of the single cord to the first power wire.

Embodiment 38. The decorative lighting assembly of Embodiment 37, wherein the first power wire extends through a passageway defined by the first fastener.

Embodiment 39. The decorative lighting assembly of Embodiment 36, further comprising a bushing that mechanically couples an intermediate portion of the single cord to the second power wire.

Embodiment 40. The decorative lighting assembly of Embodiment 39, wherein the single cord and the second power wire extend through a passageway defined by the bushing.

Embodiment 41. The decorative lighting assembly of Embodiment 36, wherein the single cord extends through a passageway defined by a clip of each lamp assembly in the second column and each lamp assembly in the third column.

Embodiment 42. The decorative lighting assembly of Embodiment 35, further comprising:

a first top-most intermediate wire that extends between a top-most lamp assembly in the first column and a top-most lamp assembly in the third column; and a bushing that mechanically couples an intermediate portion of the first top-most intermediate wire to the second power wire.

Embodiment 43. The decorative lighting assembly of Embodiment 31, wherein the first power wire and the second power wire comprise reinforced wire.

Embodiment 44. The decorative lighting assembly of Embodiment 43, wherein the intermediate wires comprise reinforced wire.

Embodiment 45. The decorative lighting assembly of Embodiment 44, wherein the reinforced wire comprises:

a longitudinally-extending reinforcing strand, the reinforcing strand comprising one or more fibers comprising a polymer material;

a plurality of conductor strands wound about the reinforcing strand; and an outer insulating layer adjacent to, and covering, one or more of the conductor strands.

Embodiment 46. The decorative lighting assembly of Embodiment 31, wherein:

the first power wire comprises 18 AWG wire;

the second power wire comprises 18 AWG wire; and the intermediate wires comprise 22 AWG wire.

Embodiment 47. The decorative lighting assembly of Embodiment 31, wherein:

the first power wire comprises 18 AWG wire;

the second power wire comprises 18 AWG wire; and the intermediate wires comprise 22 AWG reinforced wire.

Embodiment 48. The decorative lighting assembly of Embodiment 31, wherein:

the first power wire comprises 18 AWG wire;

the second power wire comprises 18 AWG wire; and the intermediate wires comprise 25 AWG reinforced wire.

Embodiment 49. The decorative lighting assembly of Embodiment 31, wherein:

the intermediate wires have a first outer diameter;

the at least one cord has a second outer diameter; and the second outer diameter is substantially equal to the first outer diameter so that the decorative lighting assembly has a uniform appearance.

Embodiment 50. The decorative lighting assembly of Embodiment 31, wherein:

the intermediate wires comprise a plurality of conductor strands and an outer insulating layer adjacent to, and covering, one or more of the conductor strands;

the at least one cord comprises a solid strand; and the insulating layer of the intermediate wires and the solid strand comprise the same material so that the decorative lighting assembly has a uniform appearance.

Embodiment 51. The decorative lighting assembly of Embodiment 31, wherein:

the intermediate wires comprise a plurality of conductor strands and an outer insulating layer adjacent to, and covering, one or more of the conductor strands;

the at least one cord comprises a solid strand; and the insulating layer of the intermediate wires and the solid strand are substantially the same color so that the decorative lighting assembly has a uniform appearance.

Embodiment 52. The decorative lighting assembly of Embodiment 31, wherein a first series circuit of the decorative lighting assembly comprises:

a first lamp assembly electrically connected to the first power wire;

an nth lamp assembly connected to the second power wire; and a plurality of intermediate lamp assemblies electrically connected in series between the first lamp assembly and the nth lamp assembly.

Embodiment 53. The decorative lighting assembly of Embodiment 52, further comprising a first connector electrically connecting a first end of the series circuit to the first power wire.

Embodiment 54. The decorative lighting assembly of Embodiment 53, further comprising a second connector electrically connecting a second end of the series circuit to the second power wire.

Embodiment 55. The decorative lighting assembly of Embodiment 54, wherein the second connector mechanically couples one end of a third cord to the second power wire.

Embodiment 56. The decorative lighting assembly of Embodiment 55, wherein the first series circuit follows a winding path between the first connector and the second connector so that the lamp assemblies are distributed across the display area.

Embodiment 57. The decorative lighting assembly of Embodiment 56, wherein the winding path of the first series circuit includes:

the plurality of intermediate wires disposed along the first zig-zag path connecting the lamp assemblies in the first column with the lamp assemblies in the second column; and the plurality of intermediate wires disposed along the third zig-zag path connecting the lamp assemblies in the third column with the lamp assemblies in the fourth column.

Embodiment 58. The decorative lighting assembly of Embodiment 52, wherein the at least one cord extends between pairs of lamp assemblies that are adjacent to one another physically and are not adjacent to one another in the first series circuit.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A tangle-free decorative-lighting assembly, comprising:

a power plug configured to connect to an external source of power;

a first power wire and a second power wire, each of the first and second power wires connected to the power plug; and a first light set in electrical connection with the power plug via the first power wire and the second power wire, the first light set defining a first electrical circuit, the light set including:

a plurality of lamp assemblies, each lamp assembly including a lamp element; and a plurality of internally-reinforced decorative-lighting intermediate wires electrically connecting the lamp assemblies, each of the plurality of internally-reinforced decorative-lighting intermediate wires including a central conductor, one or more polymeric reinforcing strands distributed about the central conductor, and an outer insulating layer surrounding the conductor and the one or more polymeric reinforcing strands; and one or more support cords mechanically connected to the first light set without being electrically connected to the first power wire, second power wire, power plug, or first light set.

2. The decorative-lighting assembly of claim 1, further comprising a second light set in electrical connection with the first light set, and wherein the one or more support cords is mechanically connected to the first light set and the second light set, including being mechanically connected to multiple light assemblies of the first light set and to multiple light assemblies of the second light set.

3. The decorative-lighting assembly of claim 2, wherein the two light sets form a rectangular shape.

4. The decorative-lighting assembly of claim 3, wherein the plurality of lamp assemblies are electrically connected to one another in an electrical series configuration.

5. The decorative-lighting assembly of claim 3, wherein the one or more support cords defines two or more sides of the rectangular shape.

6. The decorative-lighting assembly of claim 2, wherein the one or more support cords is a single contiguous cord.

7. The decorative-lighting assembly of claim 1, wherein the first power wire and the second power wire comprise internally-reinforced wires, each of the first power wire and the second power wire including a plurality of conductors, one or more reinforcing strands, and an outer insulating layer surrounding the plurality of conductors and the one or more reinforcing strands.

8. The decorative-lighting assembly of claim 1, wherein a diameter of the one or more support cords is in a range of 50% to 150% of a diameter of each of the internally-reinforced decorative-lighting intermediate wires, and a color of the one or more non-wire support cords is approximately the same as a color of each of the internally-reinforced intermediate wires.

9. The decorative-lighting assembly of claim 1, wherein a diameter of the one or more support cords is approximately the same as a diameter of each of the internally-reinforced decorative-lighting intermediate wires.

10. The decorative-lighting assembly of claim 1, wherein the one or more support cords comprises two or more support cords.

11. The decorative-lighting assembly of claim 1, wherein each of the plurality of internally-reinforced decorative-lighting intermediate wires comprises a 22 AWG wire.

12. The decorative-lighting assembly of claim 11, wherein the one or more polymeric reinforcing strands is adjacent to, and in direct contact with, one or more of the plurality of conductors.

13. The decorative-lighting assembly of claim 1, wherein the one or more polymeric reinforcing strands is in direct contact with the outer insulating layer.

14. A tangle-resistant, net-like decorative lighting structure having first, second, third and fourth sides that define a rectangular shape, the first side opposite the third side, and the second side opposite the fourth side, comprising:

a first plurality of lamp assemblies aligned with one another to form a first row of lamp assemblies extending between the second side of the rectangular shape and the fourth side of the rectangular shape;

a second plurality of lamp assemblies aligned with one another to form a second row of lamp assemblies extending between the second side of the rectangular shape and the fourth side of the rectangular shape, the second row being parallel to the first row;

a plurality of internally-reinforced intermediate wires, each of the plurality of internally-reinforced intermediate wires electrically and mechanically connected to a lamp assembly of the first plurality of lamp assemblies forming the first row and electrically and mechanically connected to a lamp assembly of the second plurality of lamp assemblies forming the second row, each of the plurality of internally-reinforced intermediate wires including a central conductor, one or more non-metallic reinforcing strands distributed about the central conductor, and an outer insulating layer surrounding the plurality of conductors and the one or more reinforcing strands; and a plurality of support cords, including:

a first support cord defining at least one of the first, second, third, and fourth sides of the rectangular shape;

a second support cord connected to a first lamp assembly of the first plurality of lamp assemblies and connected to a first lamp assembly of the second plurality of lamp assemblies so as to extend between the first row and the second row; and a third support cord connected to a second lamp assembly of the first plurality of lamp assemblies and connected to a second lamp assembly of the second plurality of lamp assemblies so as to extend between the first row and the second row, the second and third support cords extending generally parallel to one another, and wherein none of the one or more support cords are electrically connected to the first power wire, second power wire, power plug, first plurality of lamp assemblies or second plurality of lamp assemblies.

15. The lighting structure of claim 14, further comprising a third plurality of lamp assemblies defining a third row, the third row being parallel to the first and second rows, the second support cord connected to a first lamp assembly of each of the first, second and third pluralities of lamp assemblies, and wherein the first support cord forms a zig-zag pattern and the second support cord forms a zig-zag pattern.

16. The lighting structure of claim 14, wherein the lighting structure defines a first series-connected electrical circuit, and a second series-connected circuit, and a first portion of the first plurality of light assemblies comprises a portion of the first series-connected electrical circuit and a second portion of the first plurality of light assemblies comprises a portion of the second series-connected electrical circuit, such that the first row includes light assemblies in the first series-connected electrical circuit and includes light assemblies in the second series-connected electrical circuit.

17. The lighting structure of claim 14, wherein each of the one or more non-metallic reinforcing strands is displaced from the central conductor.

18. The lighting structure of claim 17, wherein each of the internally-reinforced intermediate wires is a 22 AWG wire.

19. The lighting structure of claim 18, wherein each of the one or more non-metallic reinforcing strands comprises a yarn of multiple fibers.

20. The lighting structure of claim 14, wherein the one or more reinforcing strands is in direct contact with the outer insulating layer.

* * * * *